United States Patent
Steghöfer et al.

(10) Patent No.: US 10,304,185 B2
(45) Date of Patent: May 28, 2019

(54) COMPUTER IMPLEMENTED METHOD FOR IDENTIFYING CHANNELS FROM REPRESENTATIVE DATA IN A 3D VOLUME AND A COMPUTER PROGRAM PRODUCT IMPLEMENTING THE METHOD

(71) Applicants: GALGO MEDICAL, SL, Barcelona (ES); HOSPITAL CLINIC DE BARCELONA, Barcelona (ES); UNIVERSITAT DE BARCELONA, Barcelona (ES)

(72) Inventors: Martin Steghöfer, Barcelona (ES); Luis Serra Del Molino, Barcelona (ES); Josep Brugada Terradellas, Barcelona (ES); Josep Lluis Mont Girbau, Sant Cugat del Vallès (ES); Antonio Berruezo Sánchez, Barcelona (ES)

(73) Assignees: GALGO MEDICAL, SL, Bacrelona (ES); HOSPITAL CLINIC DE BARCELONA, Barcelona (ES); UNIVERSITAT DE BARCELONA, Barcelona (ES)

( * ) Notice: Subject to any disclaimer, the term of this patent is extended or adjusted under 35 U.S.C. 154(b) by 124 days.

(21) Appl. No.: 15/314,140

(22) PCT Filed: May 22, 2015

(86) PCT No.: PCT/IB2015/000730
§ 371 (c)(1),
(2) Date: Nov. 28, 2016

(87) PCT Pub. No.: WO2015/181604
PCT Pub. Date: Dec. 3, 2015

(65) Prior Publication Data
US 2017/0103527 A1    Apr. 13, 2017

(30) Foreign Application Priority Data

May 29, 2014   (EP) .................................. 14380017

(51) Int. Cl.
G06T 7/00    (2017.01)
G06T 7/162   (2017.01)
G06T 7/11    (2017.01)

(52) U.S. Cl.
CPC .............. *G06T 7/0012* (2013.01); *G06T 7/11* (2017.01); *G06T 7/162* (2017.01);
(Continued)

(58) Field of Classification Search
CPC ......... G06T 7/0012; G06T 7/11; G06T 7/162; G06T 2207/10028; G06T 2207/30048;
(Continued)

(56) References Cited

U.S. PATENT DOCUMENTS 6,236,883 B1   5/2001   Ciaccio et al.
7,991,221 B1   8/2011   Kling
(Continued)

FOREIGN PATENT DOCUMENTS

JP   2008237882 A   10/2008

OTHER PUBLICATIONS

Qi et al. "Underwater Acoustic Channel Estimation via Complex Homotopy." IEEE International Conference on Communications, Jun. 10, 2012, pp. 3821-3825.*
(Continued)

*Primary Examiner* — Jon Chang
(74) *Attorney, Agent, or Firm* — Silvia Salvadori

(57) ABSTRACT

The method comprises identifying, in a 3D volume, a zone of a first type (H), a zone of a second type (BZ) and a zone of a third type (C) and: —automatically identifying as a candidate channel (bz) a path running through the zone of a
(Continued)

second type (BZ) and extending between two points of the zone of a first type (H); and—automatically performing, on a topological space (H_and_BZ_topo), homotopic operations between the candidate channel (bz) and paths (h) running only through the zone of a first type (H), and if the result of said homotopic operations is that the candidate channel (bz) is not homotopic to any path running only through the zone of a first type (H) identifying the candidate channel (bz) as a constrained channel. The computer program product implements the steps of the method of the invention.

17 Claims, 16 Drawing Sheets

(52) U.S. Cl.
CPC ............... *G06T 2207/10028* (2013.01); *G06T 2207/10096* (2013.01); *G06T 2207/20044* (2013.01); *G06T 2207/20072* (2013.01); *G06T 2207/30048* (2013.01); *G06T 2207/30104* (2013.01); *G06T 2207/30172* (2013.01)

(58) Field of Classification Search
CPC . G06T 2207/30104; G06T 2207/20044; G06T 2207/10096; G06T 2207/30172; G06T 2207/20072
See application file for complete search history.

(56) References Cited

U.S. PATENT DOCUMENTS

| | | | |
|---|---|---|---|
| 8,310,233 | B2 | 11/2012 | Trzasko et al. |
| 2003/0114767 | A1* | 6/2003 | Heim ..................... A61B 5/026 600/504 |
| 2009/0076375 | A1 | 3/2009 | Maschke |
| 2010/0215226 | A1* | 8/2010 | Kaufman ............... G06K 9/342 382/128 |
| 2011/0224962 | A1 | 9/2011 | Goldberger et al. |
| 2013/0204116 | A1* | 8/2013 | Schmidt ................. A61B 5/055 600/410 |
| 2015/0356742 | A1* | 12/2015 | Barbarito ............. G06T 7/0012 382/154 |

OTHER PUBLICATIONS

Berruezo A, et al, "Three-dimensional architecture of scar and conducting channels based on high resolution CE-CMR. Insights for ventricular tachycardia ablation", European Heart Journal, (2011), vol. 32, Abstract Supplement, p. 943.
Fernandez-Armenta J, et al, "Three-dimensional Architecture Of Scar And Conducting Channels Based On High Resolution ce-CMR. Insights For Ventricular Techycardia Ablation", Circ. Arrhythm. Electrophysiol. 2013;6:528-537.
Berruezo A, et al, "Combined Endocardial and Epicardial Catheter Ablation in Arrhythmogenic Right Ventricular Dysplasia Incorporating Scar Dechanneling Technique", Circ Arrhythm Electrophysiol. 2012;5:111-121 (Dec. 28, 2011).
Wijnmaalen Adrianus P, et al, "Head-to-head comparison of contrast-enhanced magnetic resonance imaging and electroanatomical voltage mapping to assess post-infarct scar characteristics in patients with ventricular tachycardias: real-time image integration and reversed registration", European Heart Journal (2011); 32,104-114.
Barbarito V, et al, "A software application for three-dimensional visualization and quantification of scars and conducting channels based on pre-procedure CE-MRI in patients with ventricular tachycardia", CARS 2012 Computer Assisted Radiology and Surgery, (Jun. 27-30, 2012), Pisa, Italy.
Larrabide I et al, "An Open Source Framework for Efficient Development of Research Tools and Clinical Prototypes", FIMH 2009, LNCS 5528, pp. 417-426, 2009.
Van Assen Hans C, et al "SPASM: A 3D-ASM for segmentation of sparse and arbitrarily oriented cardiac MRI data", Medical Image Analysis 10 (2006), pp. 286-303.
Perez-David E et al , "Noninvasive Identification of Ventricular Tachycardia-Related Conducting Channels Using Contrast-Enhanced Magnetic Resonance Imaging in Patients With Chronic Myocardial Infarction Comparison of Signal Intensity Scar Mapping and Endocardial Voltage Mapping", Journal of the American College of Cardiology, vol. 57, No. 2, 2011, pp. 184-194.
Oakes R S et al, "Detection and quantification of left atrial structural remodeling with delayed-enhancement magnetic resonance imaging in patients with atrial fibrillation", Circulation. Apr. 7, 2009;119(13), pp. 1758-1767.
Internet website—http://www.alumni.utah.edu/u-news/august09/?display=life-saving-companies.html (Aug. 2009).
Daccarett M et al, "Association of Left Atrial Fibrosis Detected by Delayed-Enhancement Magnetic Resonance Imaging and the Risk of Stroke in Patients With Atrial Fibrillation", Journal of the American College of Cardiology, vol. 57, No. 7, 2011, pp. 831-838.
Nikopoulos N et al, "An efficient algorithm for 3d binary morphological transformations with 3d structuring elements of arbitrary size and shape", IEEE Transactions on Image Processing. vol. 9. No. 3. 2000. pp. 283-286.
Dijkstra E W, "A note on two problems in connexion with graphs", Numerische Mathematik (1959) 1: 269-271.
Tsipouras M G et al, "Computer-Aided Diagnosis of Cardiac Arrhythmias", IGI Global (2009), pp. 661-666.
Cormen T H et al, Clifford (2001) "Section 24.3: Dijkstra's algorithm", Introduction to Algorithms (Second ed.). MIT Press and McGraw-Hill. pp. 658-664. ISBN 0-262-03293-7.
Trayanova N, Computational cardiology: the heart of the matter. Department of Biomedical Engineering and Institute for Computational Medicine Johns Hopkins University. International Scholarly Research Network, ISRN Cardiology; vol. 2012, Article ID 269680, (2012).
Andreu D et al, "Integration of 3D Electroanatomic Maps and Magnetic Resonance Scar Characterization Into the Navigation System to Guide Ventricular Tachycardia Ablation", Circulation: Arrhythmia and Electrophysiology, vol. 4, No. 5, Aug. 31, 2011, (Aug. 31, 2011), pp. 674-683.
International Search Report of International Parent Application No. PCT/IB2015/000730 dated Sep. 21, 2015.
European Search Report of European Priority Application No. 14380017.5 dated Nov. 14, 2014.
International Preliminary Report on Patentability of International Parent Application No. PCT/IB2015/000730 dated Nov. 29, 2016.
Written Opinion of the International Searching Authority of International Parent Application No. PCT/IB2015/000730.

* cited by examiner

Skeleton:

THM:

Graph:

LHM:

| Edge e | (1, 2) | (1, 3) | (1, 4) | (2, 3) | (2, 4) | (3, 4) |
|---|---|---|---|---|---|---|
| Homotopic Paths p | [1, 3, 2] | [1, 2, 3] | [1, 2, 4] | [2, 1, 3] | [2, 1, 4] | [3, 1, 4] |
| | [1, 4, 2] | [1, 4, 3] | [1, 3, 4] | [2, 4, 3] | [2, 3, 4] | [3, 2, 4] |

Figure 14b

| Line (3) e | Line (4)/(5) p | Line (6) p' | p" | Line (8) Remove e from Skel. | Line (9) Add entry [e → p"] to THM |
|---|---|---|---|---|---|
| (2, 3) | [2, 1, 3] | [2,3,4,1,4,3] | [2, 3] | | unchanged (Path [2, 3] contains edge (2, 3)) |
| | [2, 4, 3] | [2, 4, 3] | [2, 4, 3] | removed (2, 3) | (1, 2) → [1, 3, 2] entry unchanged (1, 3) → [1, 4, 3] entry unchanged (2, 3) → [2, 4, 3] entry added |
| (2, 4) | [2, 1, 4] | [2,4,3,4,1,4] | [2, 4] | | unchanged (Path [2, 4] contains edge (2, 4)) |
| | [2, 3, 4] | [2, 4, 3, 4] | [2, 4] | | unchanged (Path [2, 4] contains edge (2, 4)) |
| (3, 4) | [3, 1, 4] | [3, 4, 1, 4] | [3, 4] | | unchanged (Path [3, 4] contains edge (3, 4)) |
| | [3, 2, 4] | [3, 4, 2, 4] | [3, 4] | | unchanged (Path [3, 4] contains edge (3, 4)) |

Figure 14c

COMPUTER IMPLEMENTED METHOD FOR IDENTIFYING CHANNELS FROM REPRESENTATIVE DATA IN A 3D VOLUME AND A COMPUTER PROGRAM PRODUCT IMPLEMENTING THE METHOD

RELATED APPLICATIONS

This application is a US national phase application of international application number PCT/IB2015/000730, filed 22 May 2015, which designates the US and claims priority to European Application No. EP14380017.5 filed 29 May 2014, the contents of each of which are hereby incorporated by reference as if set forth in their entireties.

TECHNICAL FIELD

The present invention generally relates, in a first aspect, to a computer implemented method for identifying channels from representative data in a 3D volume, and more particularly to a method comprising automatically identifying constrained channels by means of homotopic relationships between paths, on a topological space.

The invention also relates, in a second aspect, to a computer program product which implements the steps of the method of the first aspect of the invention.

The term channel has to be understood in the present invention in a broad meaning as any passage-like structure which communicates or had communicated in the past (in the case of a blocked passage) two distant areas, such as, among others, a gas or fluid channel, a blood channel and an electrically conductive channel.

STATE OF THE PRIOR ART

In the field of myocardium scar-related Ventricular Tachycardia (VT), arrhythmia might be due to the presence of anomalous conducting channels (CC) within the Left Ventricle (LV), also called re-entry channels. The presence of CC causing re-entry is tightly connected to the isolation of stimulation propagation paths. Re-entry is only possible if the stimulation wave front is split into parts that can travel independently at different velocities during a minimum amount of time. This requires at least one of the stimulation paths to go through tissue with slow conducting properties (Border-Zone tissue, BZ) relative to normal healthy tissue. Furthermore a non-conduction barrier between the path running through BZ and all paths of regular stimulation is necessary, otherwise there can be transversal activation paths smoothing out the wave front and adjusting the conduction velocities (FIG. 1). Therefore a necessary criterion for a CC is the absence of those transversal activation paths along a certain direction. Or, in other words, a non-conducting obstacle (Core of the scar tissue) between the channel in the slow medium (BZ) and any path in the fast medium (Healthy tissue). Said conducting channels are therefore constrained channels.

Thus, the identification of myocardium conductive channels has emerged as a need from the field of electrophysiology (EP), the medical specialty of cardiology intended to treat patients with arrhythmia. Arrhythmia can result from many causes, among these the scarring of heart tissue, such as that caused by a heart attack. In addition, cardiac arrhythmia can occur in any of the heart chambers and can also be classified according to the heart rate they produce. In particular, in this discussion we will focus on scar-related Ventricular Tachycardia (VT), which might be due to the presence of anomalous conducting channels (CC) within the Left Ventricle (LV), also called re-entry channels. If a heart attack produces scar tissue within the myocardium, and this scar is such that it has channels within itself, these channels, which are due to the presence of viable myocytes inside the scar tissue, can generate re-entrant circuits associated with VT. Effective treatment of scar-related VT can be performed with radio-frequency ablation using a catheter that is inserted into the arteries to reach the endocardium or the epicardium. Once there, the catheter is used by the EP to produce a lesion on the CC in the muscle of the heart, at a location that will stop the arrhythmia from happening. This location has to be identified carefully to avoid creating lesions on viable tissue that is not contributing to the arrhythmia problem.

Currently, EP uses a 'navigation' device to perform an electro-anatomical mapping (EAM) of the endocardium. The navigation device uses 3D tracking technology to compute the position of the tip of the catheter. The anatomy of the patient's heart is available from the volumetric scans obtained from CT or MR devices. The volumetric scans produce 'frozen' pictures at the end of systole. During the catheter intervention, the volumetric scan can be registered with the heart of the patient, based on the coordinate system collected by the catheter while in the myocardium. This allows the navigation system to display the heart (usually a polygonal mesh extracted from the volumetric data corresponding to the endocardium wall) together with a picture of the catheter, in 3D. The catheter also can read voltages from its tip to measure the electrical activity on the heart walls. This is used to map the endocardium and the epicardium walls, by moving and dragging the tip along the wall to obtain as many readings as possible in order to obtain as complete a picture as possible of the voltages. The voltage indicates the condition of the heart muscle, with scar tissue signal at the lower end of the range, and healthy tissue giving the maximum. This is a laborious process that usually requires a few hundred point readings. These readings are interpolated by the navigation device to produce a map of the voltages. Then, the EP tries to induce arrhythmia by pacing the heart in different points along its conduction paths, in order to identify the sources of abnormal electrical activity. Using the visual information provided by the voltage map, the EP has to decide where to ablate to stop the arrhythmia. Once located the best point, the catheter is repositioned, and RF is used to produce a lesion to the muscle. Then the EP tries to induce arrhythmia, and if it does not recur, the patient is considered successfully treated.

This process takes three to four hours. This limits the number of patients that can have access to this treatment. It is also tiring for the clinical team, as well as hazardous since it involves a certain amount of radiation due to the use of fluoroscopy to monitor the position of the catheter at certain intervals of the intervention. Such a process of three to four hours long also entails a high risk for the patient's health.

US 2009/0076375 A1 discloses providing imaging means in an ablation catheter, for a subsequent ablation process, which allows automatically identifying "damaged conduction path tissue" by processing the obtained 3D images according to program means execute in a control device, by implementing image processing algorithms, for example which typically allow edge detection or allow deviations in structure in specific areas of an image or patterns to be detected. The automatic identification is performed on the tissue containing damaged conduction paths, but not on the conduction path itself.

Recently, with the arrival of a MR protocol known as Delayed Enhancement MR, it has become possible to visualize the scar tissue in the heart (in patients without a defibrillator; next generation defibrillators will be DE-MRI compatible and this limitation will disappear). These DE-MRI volumes capture information from the health of muscle cells to reveal which ones belong to scar and which to healthy tissue, as defined by a range of intensity signal values that put scar as the highest and healthy as the lowest. Viable tissue cells inside the scar tissue can have intensity values in between the range of scar and healthy tissue and are classified as Border Zone (BZ). The DE-MRI volumes can be visualized in several ways to produce an image to be interpreted visually by the EP, in order to determine where the possible CCs that induce arrhythmia are. Since these CCs are three dimensional (they can run within the myocardium in any direction, either along the walls or in between them) and they are embedded within the myocardium, which is also a volume, they are hard to visualize. This requires processing the DE-MRI volume to identify the endo- and epicardium surfaces in order to be able to focus the visualization on the myocardium. If the endo- and epi-cardium are identified in the LV then the values of scar, Border Zone and Healthy tissue can be interpreted more clearly and not be confused with blood within the LV.

There are several ways to visualize the resulting myocardium. The simplest is to perform multiplanar reformatting to the volume, to show the values as intensities along planes that cut through the volume. This is usually done either along the acquisition planes, or by defining new axis on the volume corresponding to patient anatomy, like for example the short axis of the LV.

Another visualization method is to 'render' the myocardium as a volume as it would be seen when looking at the real, but isolated object, using perspective projection and 'shading' technique.

The present inventors developed a visualization technique that starts from the segmented walls of the endo and epicardium (see [7] for the segmentation approach used), and interpolates a variable number of surfaces in between (see [2] for the visualization method). These surfaces, or Layers, are polygonal meshes, and their number should be made optimal to capture all the information within the myocardium. Too few layers and one could miss a CC, and too many and one would be spending time and resources in duplicating information.

The interpolated surfaces, following a principle similar to the layers of an onion, intersect the myocardium and where they do they take the corresponding value of the DE-MRI. The value assigned to the surface is color-coded to help with the visualization. In particular, high values (scar) are made red, low values are made violet (healthy tissue), and intermediate values green (border zone). The thresholds used to assign colours to surface values can be controlled by the user.

The EP visually inspects each layer to detect a channel. Since channels are normally running inside the myocardium, usually at a depth of at least a 10% of its thickness, from the epicardium, and deeper, and can even run perpendicular to the interpolated layers, it is easy to miss them using visual inspection. Inspecting CC on a single layer depends greatly on the experience of the ER. This involves manually rotating the myocardium to see all the possible angles, and to do that for all the layers created. The more layers generated, the more accurate the visualization and the less of a chance to miss a conducting channel that may fall in between layers. But at the same time, the more time consuming the process becomes. But this only covers the CC running along a Layer. It is very hard for the human eye to follow a potential CC across layers, since it involves switching between layers and keeping track of the ins and outs of the CC.

Moreover, reference [8] also discloses identifying conducting channels from 3D volumetric data obtained from Contrast-Enhanced MRI (ceMRI), by means of signal intensity distribution, which makes the above mentioned Healthy (H), Border Zone (BZ) and Scar (S) tissue zones definition, although in this case the BZ is referred as heterogeneous tissue. In [8] the final CC identification is performed by visual inspection, and they refer to the whole heterogeneous tissue (HT) as being a conductive channel (called HT channel), not specifying that a more accurate identification of a conductive channel within the heterogeneous tissue is performed.

Reference [16] describes the state of the art regarding the newest developments in computational cardiology, including the use for, among others, ventricular tachycardia, of 3D cardiac models and their use in diagnostic procedures. None of said newest developments discloses a complete automatic identification of conducting channels.

Such a complete automatic identification of CCs is only known from other kind of source which is not 3D image data, as is the case of U.S. Pat. No. 6,236,883 B1 and JP 2008237882 A, the former using ECG features while the latter uses pace mapping.

To sum up, the computer implemented methods for identifying channels in a 3D volume already known are only automatic until the different zones are shown in a display in order to allow the electrophisiologist to visually identify the CCs, i.e., this last step is not performed automatically. This is the case of [7] and of a software implementation thereof developed by the present inventors [5].

Some other publications are available describing said software and the results obtained with its application on real cases [1][2][3].

Other publications are available, which can be considered as prior art to the present invention, but which do not either disclose the complete automatic identification of CCs. Some research groups have been working on the post-processing of DE-MRI cardiac images, and some of them developed and published methods to assess post-infarction scar characteristics associated with VT. See [4], [9], [10] and [11].

Other examples of available commercial tools for 3D visualization and segmentation of the heart are:

CMRtools (www.cmrtools.com)
TomTec (www.tomtec.de)
Segment (www.medviso.com/products/segment/)
MEDIS
PIE MEDICAL US 2011/224962 A1 discloses a system which simulates stimulation of scar tissue identified in a 3D model of a patient heart generated from 3D voxels obtained from image data segmentation of a 3D volume image element comprising said patient heart, together with impaired tissue and normal heart tissue, according to luminance intensity thresholds.

A stimulation processor simulates electrical stimulation of the patient heart using the model to identify risk of heart impairment.

The system automatically identifies risk for rapid, potentially dangerous heart rhythms and myocardial infarction by simulation of ventricular tachycardia circuits using in-vivo MRI and a simplified computer model of cardiac electrophysiology for noninvasive risk stratification for sudden cardiac death.

The automatic identification disclosed by US 2011/224962 A1, and performed in the segmented 3D voxels, is only related to said scar tissue, impaired tissue and normal heart tissue areas identification.

Although US 2011/224962 A1 admits the influence of re-entrant circuits around the infarct scars in ventricular tachycardia, indicating that said circuits can be complex containing areas of slow conduction and multiple pathways of re-entry, no automatic identification of any of said pathways, nor of any channels or of any other element within any of said identified areas is disclosed at all in US 2011/224962 A1. In other words, ventricular tachycardia circuits are only simulated but not automatically identified at all.

No method is known in the state of the art which performs said last step, i.e. the one regarding the identifying of the conductive channels, automatically, regarding the myocardium conductive channels.

In addition to said identification of myocardium conductive channels, there are many other application fields where many type of objects include zones which are susceptible to include constrained channels which are wanted to be identified, such as subterranean gas or fluid channels in the field of geophysical exploration, cracks in the mechanical industry or any kind of channels in the medical or veterinary field.

No method is known in the state of the art which performs the automatic identification of such constrained channels of said other application fields.

U.S. Pat. No. 8,310,233 B2 discloses a method for image reconstruction from undersampled medical imaging data, such as MRI data, by iteratively minimizing an objective function that includes a concave metric prior that is homotopic with an $l_0$-norm. In other words, the method disclosed in said patent uses homotopies between norms, a concept which is not related to topological spaces but to vector spaces. Moreover, said homotopies are not used to determine properties of paths but to solve a minimization problem.

U.S. Pat. No. 7,991,221 B1 discloses a data processing system utilizing topological methods to manipulate and categorize n-dimensional datasets, for evaluating a convolution of two or more geometric objects using at least numeric quantities given by computations of an algebraic topological invariant including one of: homology, cohomology, relative homology, relative cohomology, homotopy groups, K-theory, generalized homology, or generalized cohomology.

Among the possible applications of the system of U.S. Pat. No. 7,991,221 B1, medicine is mentioned and, more specifically, the use of homology density for studying brain pathways by locally labelling the matter according to its composition densities and investigating homology convolutions is disclosed as a possible application.

Neither the use of homotopy for said brain pathways application nor any other application related to paths is disclosed in U.S. Pat. No. 7,991,221 B1.

The present inventors don't know any proposal disclosing the use of homotopy for automatically identifying channels in a 3D volume particularly in this medical field.

REFERENCES

[1] A. Berruezo, J. Fernandez-Armenta, O. Camara, E. Silva, L. L. Mont, D. Andreu, A. Frangi, J. Brugada, *Three-dimensional architecture of scar and conducting channels based on high resolution CE-CMR. Insights for ventricular tachycardia ablation*, European Heart Journal (2011) 32 (Abstract Supplement), 943.

[2] Fernandez-Armenta, J. Camara, O., Silva, E. Mont, L. Andreu, D. Sitges, M. Herzcku, C. Frangi, A. F. Brugada, J. Berruezo, A. *Three-dimensional Architecture Of Scar And Conducting Channels Based On High Resolution ce-CMR. Insights For Ventricular Techycardia Ablation*, Heart Rhythm Society's Annual Scientific Sessions, Moscone Center, 2011.

[3] Berruezo A, Fernández-Armenta J, Mont L, Zeljko H, Andreu D, Herczku C, Boussy T, Tolosana J M, Arbelo E, Brugada J., *Combined Endocardial and Epicardial Catheter Ablation in Arrhythmogenic Right Ventricular Dysplasia Incorporating Scar Dechanneling Technique*, Circ Arrhythm Electrophysiol. (2011) Dec. 28.

[4] Adrianus P. Wijnmaalen, Rob J. van der Geest, Carine F. B. van Huls van Taxis, Hans-Marc J. Siebelink, Lucia J. M. Kroft, Jeroen J. Bax, Johan H. C. Reiber, Martin J. Schalij, and Katja Zeppenfeld Department of Cardiology, *Head-to -head comparison of contrast-enhanced magnetic resonance imaging and electroanatomical voltage mapping to assess post-infarct scar characteristics in patients with ventricular tachycardias: real-time image integration and reversed registration*, European Heart Journal (2011) 32, 104-114.

[5] Valeria Barbarito, Luigi Carotenuto, Luis Serra, Oscar Camara, Juan Fernandez-Armenta, Antonio Berruezo, Alejandro Frangi, *A software application for three-dimensional visualization and quantification of scars and conducting channels based on pre-procedure CE-MRI in patients with ventricular tachycardia*, CARS 2012, Jun. 27-30, Pisa, Italy.

[6] Larrabide I, Omedas P, Martelli Y, Planes X, Nieber M, Moya J A., Butakoff C, Sebastian R, Camara O, De Craene M, Bijnens B H, Frangi A F, *GIMIAS: An Open Source Framework for Efficient Development of Research Tools and Clinical Prototypes, Func Imaging and Modeling of the Heart*, ser. Lecture Notes in Computer Science (2009), vol. 5528, pp. 417426.

[7] Hans C. van Assen, Mikhail G. Danilouchkine, Alejandro F. Frangi, Sebastian Ordas, Jos J. M. Westenberg, Johan H. C. Reiber, Boudewijn P. F. Lelieveldt, SPASM: A 3D-ASM for segmentation of sparse and arbitrarily oriented cardiac MRI data, Medical Image Analysis 10 (2006) 286-303.

[8] Esther Perez-David, Ángel Arenal, José L. Rubio-Guivernau, Roberto del Castillo, Leonardo Atea, Elena Arbelo, Eduardo Caballero, Veronica Celorrio, Tomas Datino, M D, Esteban Gonzalez-Torrecilla, Felipe Atienza, Maria J. Ledesma-Carbayo, Javier Bermejo, Alfonso Medina, Francisco Fernandez-Avilés. *Noninvasive Identification of Ventricular Tachycardia-Related Conducting Channels Using Contrast-Enhanced Magnetic Resonance Imaging in Patients With Chronic Myocardial Infarction Comparison of Signal Intensity Scar Mapping and Endocardial Voltage Mapping*, JACC 2011:184-94.

[9] Oakes R S, Badger T J, Kholmovski E G, Akoum N, Burgon N S, Fish E N, Blauer J J, Rao S N, DiBella E V, Segerson N M, Daccarett M, Windfelder J, McGann C J, Parker D, MacLeod R S, Marrouche N F., *Detection and quantification of left atrial structural remodeling with delayed-enhancement magnetic resonance imaging in patients with atrial fibrillation*, Circulation. 2009 Apr. 7; 119(13):1758-67.

[10] http://www.alumni.utah.edu/u-news/august09/?display=life-saving-companies.html

[11] Marcos Daccarett, Troy J. Badger, Nazem Akoum, Nathan S. Burgon, Christian Mahnkopf, Gaston Vergara, Eugene Kholmovski, Christopher J. McGann, Dennis Parker, Johannes Brachmann, Rob S. MacLeod, and Nassir F. Marrouche, *Association of Left Atrial Fibrosis Detected by Delayed-Enhancement Magnetic Resonance Imaging and the Risk of Stroke in Patients With Atrial Fibrillation*, J Am Coll Cardiol, 2011; 57:831-838.

[12] N. Nikopoulos et al. *An efficient algorithm for 3d binary morphological transformations with 3d structuring elements for arbitrary size and shape*. IEEE Transactions on Image Processing. Vol. 9. No. 3. 2000. pp. 283-286.

[13] Dijkstra, E. W. *A note on two problems in connexion with graphs*. Numerische Mathematik (1959) 1: 269-271.

[14] Markos G. Tsipouras, Dimitrios I. Fotiadis, Lambros K. Michalis: IGI Global: Computer-Aided Diagnosis of Cardiac Arrhythmias (9781605660264): Book Chapters

[15] Cormen, Thomas H.; Leiserson, Charles E.; Rivest, Ronald L.; Stein, Clifford (2001). "Section 24.3: Dijkstra's algorithm". Introduction to Algorithms (Second ed.). MIT Press and McGraw-Hill. pp. 595-601. ISBN 0-262-03293-7.

[16] Computational cardiology: the heart of the matter. Dr. Natalia Trayanova. Department of Biomedical Engineering and Institute for Computational Medicine Johns Hopkins University. 2012.

DISCLOSURE OF THE INVENTION

It is an object of the present invention to provide an alternative to the prior state of the art, which covers the gaps found therein, particularly those related to the lack of proposals which perform an automatic identification of channels in a 3D volume.

To that end, the present invention concerns a computer implemented method for identifying channels from representative data in a 3D volume, which comprises identifying, in a 3D volume of an object, three different zones based on values of at least one physical and/or functional parameter representative of physical and/or functional properties of said object, as a zone of a first type, a zone of a second type and a zone of a third type (C), where said first, second and third types are different to each other.

Contrary to the known methods, where said zones, or portions thereof (such as patches), are only displayed in order to allow a skilled person to perform visually the accurate identification of the channels, the method of the present invention comprises, in a characteristic manner, performing the next steps by processing said representative data:

- automatically identifying as a candidate channel a path running through the zone of a second type and extending between two points of said zone of a first type; and
- automatically performing, on a topological space including the zone of a first type and the zone of a second type, homotopic operations between said candidate channel and paths running only through the zone of a first type, and if the result of said homotopic operations is that the candidate channel is not homotopic to any path running only through the zone of a first type identifying the candidate channel as a constrained channel.

Next, in the present description, said zone of a first type and zone of a second type are called, respectively, well-defined zone and not-well-defined zone.

The homotopic operations are preferably performed for several candidate channels.

Depending on the embodiment, said physical and/or functional parameter is associated to at least one of absorption or reflection of light, magnetic or electromagnetic radiation, temperature, electricity, signal intensity, signal phase, time, frequency and colour, etc., or a combination thereof, and their values are obtained as a response to any known 3D volume generating technique, such as an X-rays based technique for obtaining X-rays absorbance parameter values, an ultrasound exploration based technique for obtaining TOF (Time of Flight) values of reflected ultrasound waves, a MRI technique for obtaining RF signals emitted by tissues submitted to a magnetic field, an Electro Anatomical Mapping (EAM), etc.

In the present invention, the terms 3D volume refer to any kind of 3D volume, including a solid volume, a hollow volume and also a polygonal mesh with a 3D shape, such as an EAM polygonal mesh.

For a preferred embodiment, said physical and/or functional properties relate to propagation velocity properties, said well-defined zone being a fast propagation velocity zone and said not-well-defined zone being a slow propagation velocity zone.

That lack of homotopy between a channel and any path running only through the well-defined zone is due to the existence of an obstacle between them, which causes the absence of transversal propagation paths along a certain direction.

For an embodiment, the method of the first and second aspects of the present invention is applied to a medical or veterinary field, preferably to the automatic detection of channels in internal organs, such as the heart, brain, lungs, etc.

For said preferred embodiment applied to internal organs, said channels are generally electrically conductive channels, in which case the well-defined zone is an electrically fast conducting zone and the not-well-defined zone is an electrically slow conducting zone, or blood channels, in which case the well-defined zone is a fast propagated blood supply zone and the not-well-defined zone is a slow propagated blood supply zone.

For a more preferred embodiment, said channels are myocardium conducting channels, the well-defined zone corresponding to a healthy tissue zone and the not-well-defined zone being a border tissue zone, where said 3D volume, or a sub-volume thereof, is a myocardium 3D volume. In this case, the obstacle placed between a constrained channel running through the border tissues zone and the regular stimulation paths running through the healthy tissue zone is a non-conducting obstacle constituted by a core of a scar tissue, which causes the absence of transversal activation paths along a certain direction.

For another embodiment, the method is applied to geophysical exploration, to identify fluid channels, in which case the well-defined zone is a zone containing fluid propagating at a fast velocity and the not-well-defined zone is a zone containing fluid propagating at a slow velocity, such as a sandy zone. In this case, the obstacle could be a zone non containing or not susceptible of containing fluid, such as a rock.

For an embodiment, the method of the first aspect of the invention comprises:
- performing a conversion of the 3D volume into said topological space,
- processing said topological space and obtaining equivalence classes for said paths, and
- performing said homotopic operation only for one representative path per equivalence class, bot for channel candidates and for paths running only through the well-defined zone.

For a preferred variant of said embodiment, said topological space is a combined zones topological space, the method comprising performing a conversion of the well-defined zone sub-volume into a corresponding single zone topological space, and implementing a first algorithm, or Algorithm 1, for obtaining said equivalence classes, which has as inputs both of said topological spaces and which generates as output an output set of representatives of channel equivalence classes, one representative path per class, in a topological space.

Other embodiments of the method of the first aspect of the present invention are described according to the appended claims and in a subsequent section related to the detailed description of several embodiments.

A second aspect of the present invention relates to a computer program product, which includes code instructions that when executed in a computer implement the steps of the method of any of the previous claims.

Another aspect of the present invention relates to an Electro Anatomical Mapping (EAM) system, comprising:
- a catheter having one or more electrodes for acquiring values of an electrical parameter (such as voltage) and/or of a parameter associated thereto, at different points of at least an endocardium and/or epicardium when travelling there through; and
- computing navigation means in communication with said catheter and comprising:
  - locating means configured for collaborating with said catheter to locate its positions along said travelling through the endocardium and/or epicardium; and
  - reading means configured for collaborating with said catheter to read the values acquired thereby;
wherein said computing navigation means are configured and arranged for accessing said read values and located catheter positions, correlate them and build and store in memory means an EAM 3D volume therewith, in the form of a polygonal mesh with a 3D shape, and comprises a display for displaying at least part of said EAM 3D volume.

Contrary to the known EAM systems, in the EAM system of the present invention the computing navigation means implement, by means of one or more algorithms, the method of the first aspect of the present invention for identifying myocardium conducting channels from representative data in said polygonal mesh.

BRIEF DESCRIPTION OF THE DRAWINGS

The previous and other advantages and features will be better understood from the following detailed description of embodiments, with reference to the attached drawings, which must be considered in an illustrative and non-limiting manner, in which:

In FIG. 7a the two inputs for the algorithm are shown, i.e. the topological spaces H and H+BZ, and also a graphical representations of the execution of the first three lines of the algorithm; FIGS. 7b, 7c and 7d show graphical representations of the execution of lines 4, 5 and 6 of the algorithm for, respectively, a first, a second and a third candidate channel path bz, and a final box indicating the state of the set of representative of channel equivalence classes (abbreviated as Set of channels) after each execution sequence.

FIG. 11b Legends of the elements shown in FIG. 11a.

FIGS. 12a-12b show an example of the application of Algorithm 6. In FIG. 12a the inputs for the algorithm are shown, i.e. a Skeleton, a THM and two given paths p1, p2 whose homotopy must be checked; FIG. 12b is a table showing the execution of the algorithm, including the skeleton projections and the removing of reversal points for both paths (left columns for p1 and right columns for p2) and the equality checking (central box at the bottom line of the shown table) of the finally obtained paths.

FIGS. 14a to 14c show an example of the implementation of Algorithm 7: (a) the inputs of said algorithm: a graph and a LHM; (b) and (c) tables showing the execution of the different steps of Algorithm 7 for the construction of a Skeleton and THM.

DETAILED DESCRIPTION OF SEVERAL EMBODIMENTS

Mathematical Constrained Channel Definition:

In order to make more understandable the method of the present invention, in this section first a mathematical definition of a constrained channel and of homotopies and homotopic paths, as understood in the present invention, is performed.

Figure 1:
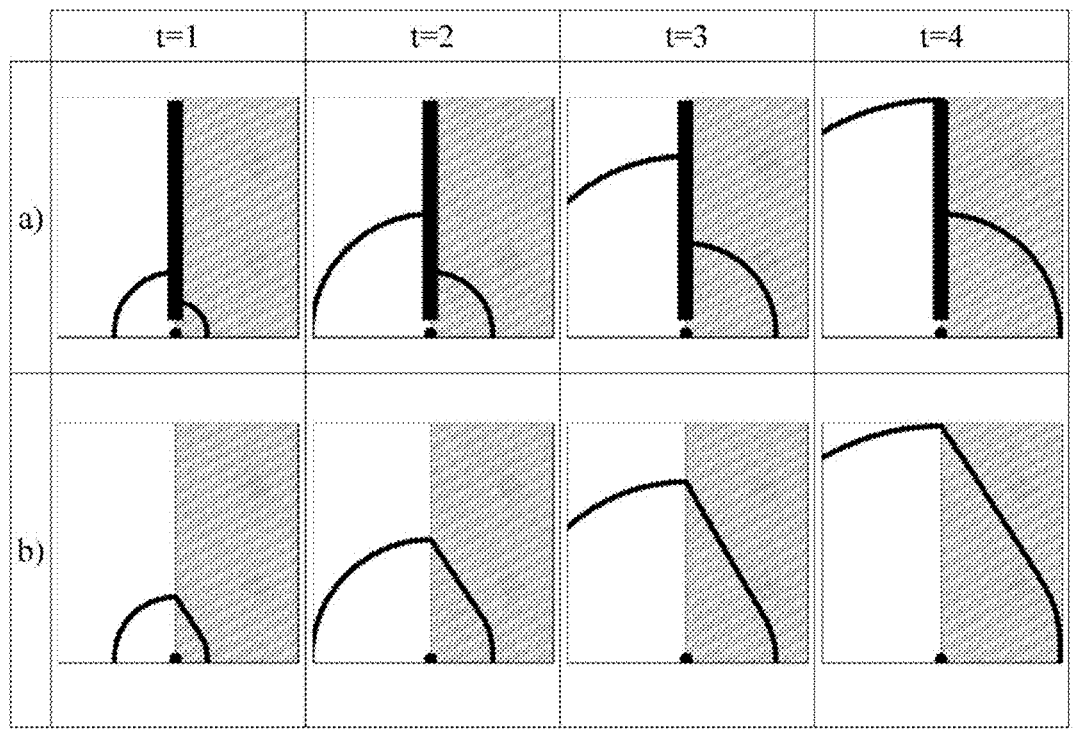
FIG. 1 is schematic visualization of the propagation of the stimulation in two different media with different propagation velocities (i.e. through a well-defined zone and a not-well-defined zone, according to the terminology used above), starting from a single point of stimulation. The wavefront is shown in periodic intervals, from time t=1 to time t=4. The propagation velocity in the medium on the left (white rectangle) is 2 times as high as in the medium on the right (shaded rectangle). In case (a) the two media are separated by a non-conducting barrier (such as a scar for the myocardium channel application), shown by means of a vertical black bar, in case (b) the stimulus can freely pass between the two media.

Synchronized vs. Isolated Stimulation Paths:

The presence of conducting channels causing re-entry (which is an example of a constrained channel) is tightly connected to the isolation of stimulation propagation paths. Re-entry is only possible if the stimulation wavefront is split into parts that can travel independently at different velocities during a minimum amount of time. FIG. 1 a) shows how a non-conducting barrier can split the wavefront into 2 parts, each of which travelling at its own propagation velocity determined by the physical and/or functional properties of the underlying medium (tissue properties, for Medical or Veterinary applications). With this barrier missing in FIG. 1b) the same difference in propagation velocity of the two media doesn't result in a wavefront separation.

As a good approximation, stimulus propagation can be seen as a chain reaction of cell stimulation. A cell is stimulated by the first stimulus that arrives from any of its neighbouring cells. This means that its time of activation is determined by the fastest (not necessarily shortest) path from the initial stimulus to the cell, which will be called "activation paths" in the following.

Figure 2:
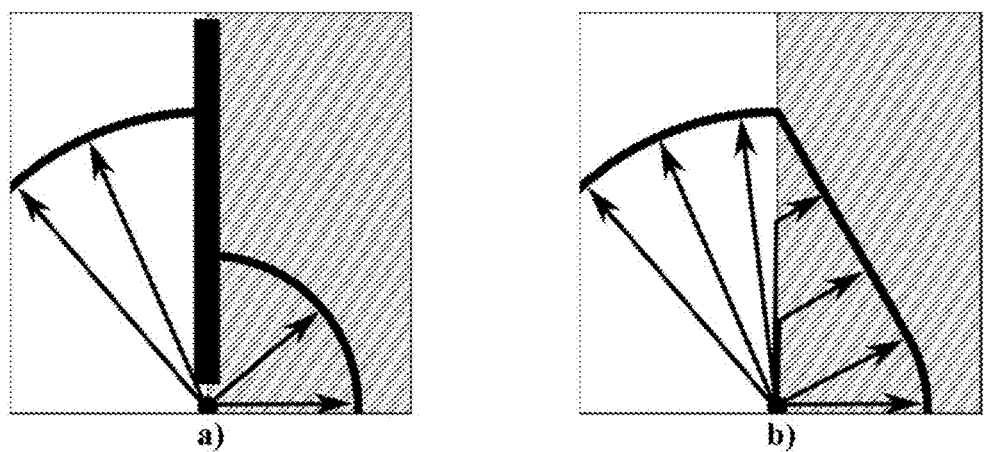
FIG. 2: Wavefront and activation paths for the example from FIG. 1 at time t=3.

FIG. 2 shows several of those activation paths for the propagation of FIG. 1, at t=3. This illustrates how the wavefront can stay connected in case (b), regardless the different propagation velocities: While in case (a) there can only be direct propagation paths running through only a single medium, the missing barrier in case (b) permits activation paths that use the faster medium at first and then enter the slower medium under an angle determined by Snell's law of refraction. They can reach points in the slower medium faster than a direct path through the slower medium. The closer the point to the boundary of the media, the less distance has to be travelled in the slower medium and the closer the path's average propagation velocity to the propagation velocity of the faster medium. This creates a continuous transition that keeps the wavefront intact.

Figure 3:
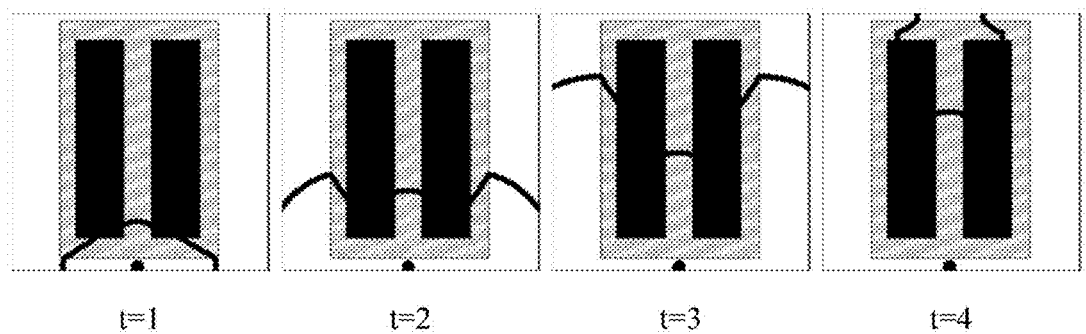
FIG. 3: Wavefront propagation for a conducting channel between two cores (black rectangles) separating the channel running through the shaded zone (not-well-defined zone) from the white zone (well-defined zone), corresponding, respectively to border zone tissue and healthy tissue, when the method is applied to the identification of myocardium conducting channels.

FIG. 3 shows the wavefront propagation for a conducting channel between two cores (black rectangles) separating the channel running through the shaded zone (not-well-defined zone) from the white zone (well-defined zone), corresponding, respectively to border zone tissue and healthy tissue.

In the case of having a non-conducting barrier separating the two media, those activation paths smoothing out the wavefront cannot exist, preventing the "leaking" of stimulus from the faster into the slower medium. This makes it possible to have two independent wavefronts travelling at different velocities.

As a conducting channel is characterized by that independence of the stimulus propagation, the existence of such transversal activation paths rule out the presence of a conduction channel. So, a necessary criterion for a conducting channel is the guaranteed absence of those transversal activation paths along a certain way, or in other words a non-conducting (core) obstacle between the channel in the slow medium (border-zone tissue, for the myocardium embodiment) and any path in the fast medium (healthy tissue, for the myocardium embodiment).

Figure 15:
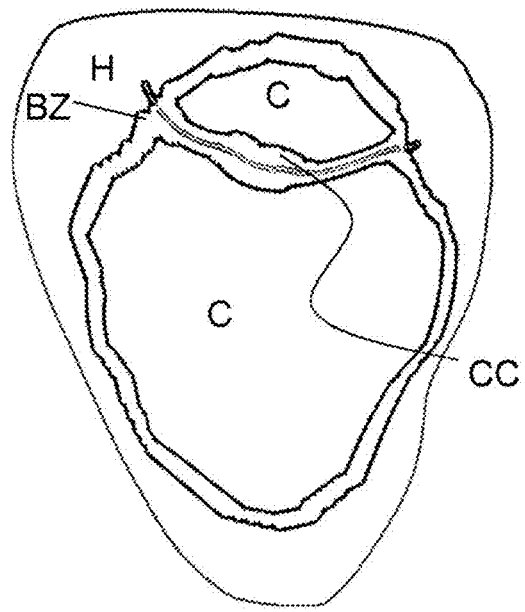
FIG. 15 schematically shows a representation of a cross-section of part of a myocardium, for a preferred embodiment of the method of the first aspect of the invention related to the identification of conductive channels in the myocardium, where the well-defined zone is a healthy tissue zone H, the not-well-defined zone is a border tissue zone BZ, the blocks are cores of scars S, and the conductive channel is indicated by the reference CC and is passing through the BZ zone between the gap existing between the two C blocks, and has a start point and an end point placed at the H zone.

The preferred embodiment related to the identification of myocardium conductive channels is schematically illustrated in FIG. 15, where the well-defined zone is a healthy tissue zone H, the not-well-defined zone is a border tissue zone BZ, the blocks are cores of scars S, and the conductive channel is indicated by the reference CC and is passing through the BZ zone between the gap existing between the two C blocks, and has a start point and an end point placed at the H zone.

Homotopies and Homotopic Paths:

The method of the present invention is inspired by the definition of homotopic paths used to characterize topological spaces.

In a topological space X a homotopy between two paths f and g (modelled as continuous functions from [0,1] to X) is a continuous function h from [0,1]×[0,1] to X such that:
1. $h(x,0)=f(x)$ for all $x\in[0,1]$
2. $h(x,1)=g(x)$ for all $x\in[0,1]$
3. $h(0,t)=f(0)$ for all $t\in[0,1]$
4. $h(1,t)=f(1)$ for all $t\in[0,1]$ Two paths f and g are called homotopic, if there exists a homotopy between them.

The intuitive interpretation of the definition is: Two paths f and g are homotopic if and only if they start and end at the same point (conditions 3 and 4 ensure that $f(0)=g(0)$ and $f(1)=g(1)$) and there is a continuous deformation that deforms path f (at t=0) to path g (at t=1). The first parameter of h can be seen as the trajectory parameter that runs through the path (from the start x=0 to the end x=b). The second parameter of h can be seen as a "slider" controlling the transition (for t=0 the path is equal to f, in the interval]0,1[ it continuously transforms itself till it reaches g at t=1). That transformation is not allowed to make any "jumps" (that would be a discontinuity in the second parameter of h) nor is it allowed to tear apart the path during the process (this would be a continuity in the first parameter of h). This is possible if and only if there is no "obstacle" between the two paths that obstructs the deformation.

Figure 4:
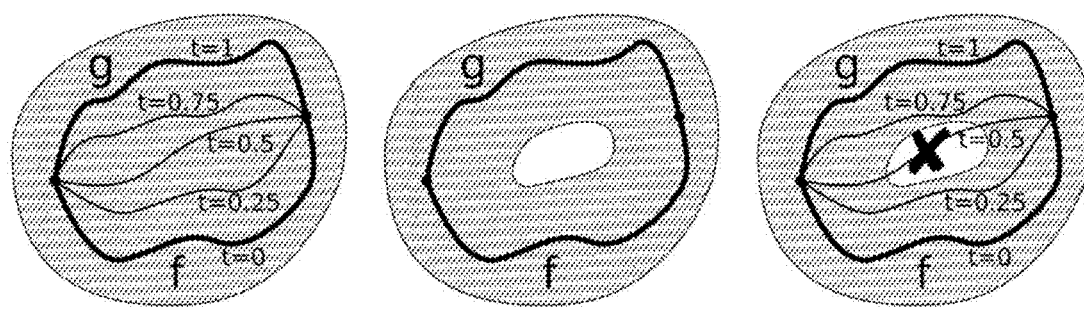
FIG. 4: (a) Two homotopic paths and their homotopy; (b)-(f) Two paths that are not homotopic: No homotopy between them can be found because of an obstacle/hole in the middle. The two paths are referred to as g and f.
Figure 4:
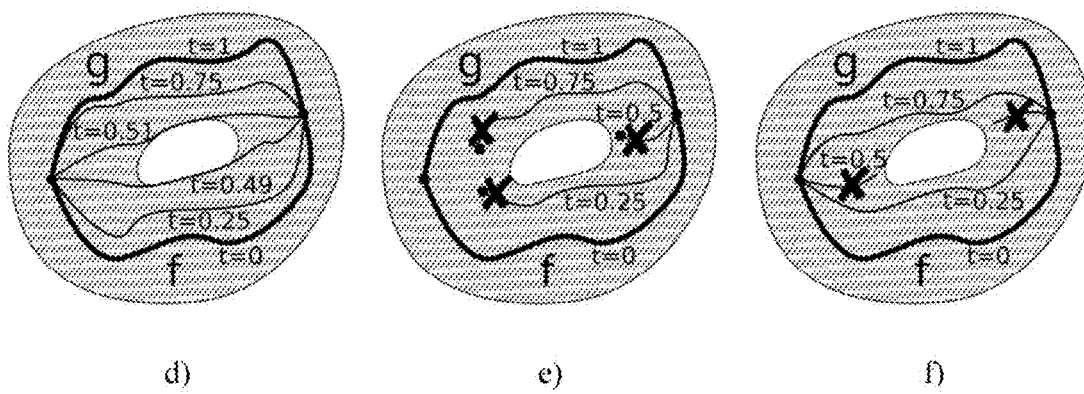

The example (a) in FIG. 4 shows a homotopy between two homotopic paths f and g by showing the intermediate paths of the transformation (the images of [0,1] under $h(*,0)=f$, $h(*,0.25)$, $h(*,0.5)$, $h(*,0.75)$ and $h(*,1)=g$). In the example (b) no homotopy between f and g exists because of a hole in the topological space between the two paths. Different approaches to the (impossible) task of finding a homotopy include passing through the hole (shown in (c); disallowed because this implies that h takes values outside the topological space X, for example $h(1/2, 1/2) \notin X$), jumping over the hole (shown in (d); disallowed because this would mean a discontinuity of h in the second parameter), disconnecting the path from the original start or end point and reconnecting after reaching the other side of the obstacle (shown in (e); disallowed because of condition 3 and 4 that ensure that the start point and end point are kept during the whole deformation) and tearing the path apart in two pieces, one of passes on each side, and reconnecting the pieces on the other side of the obstacle (shown in (f); disallowed because that would imply a discontinuity in the first parameter of h).

Figure 5:
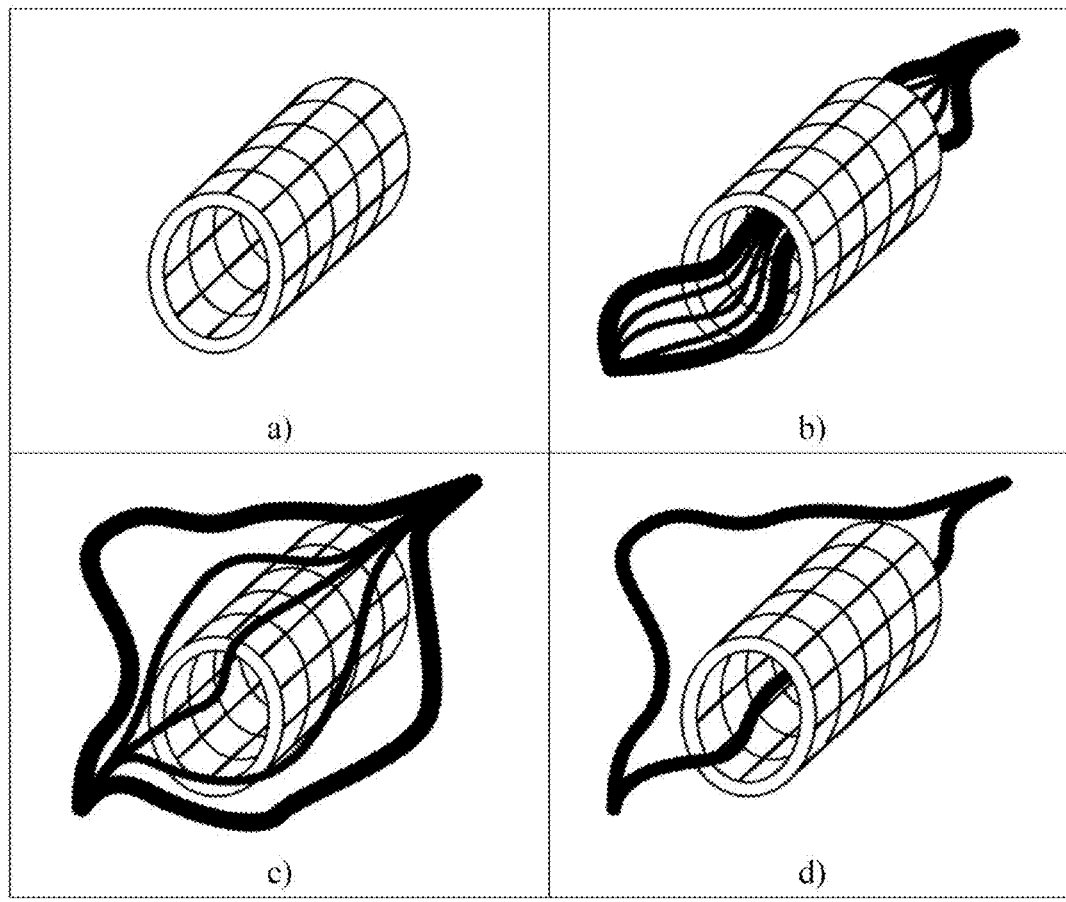
FIG. 5: Homotopies in a topological space induced by a 3D space. (a) The topological space; the volume of the tube wall doesn't belong to the topological space ("hole", "obstacle"), all the rest does. (b) Two homotopic paths (shown by thick black lines) within the tube and 3 intermediate paths (shown by thinner black lines) of the homotopy. (c) Two homotopic paths outside the tube and 3 intermediate paths of the homotopy. (d) Two non-homotopic paths, one inside of the tube, the other one outside. The tube wall prevents a continuous deformation.

Whereas the examples in FIG. 4 are topological spaces induced by 2D geometrical spaces, the homotopy definition will be applied mainly to spaces induced by 3D geometrical spaces in the Channel Detection. FIG. 5 shows examples of homotopic and non-homotopic paths in a very simple space of that kind.

It is known that the above definition of homotopic paths induces an equivalence relation that is therefore reflexive, symmetric and transitive. Furthermore this allows us to work with equivalence classes and to partition the set of all paths between two given points in equivalence classes. For every property defined by homotopies only one representative of every equivalence has to be checked and the outcome will be the same for all other members of the class.

Homotopy in Channel Detection:

In the case of channel detection, the method of the present invention uses the not-well-defined zone and the well-defined zone (i.e. conducting tissue including the Border-Zone and Healthy zone volumes, for the myocardium embodiments, as shown in FIG. 15) as topological space and any core as obstacle that impedes the continuous deformation. Then, having two paths A and B that are not homotopic can be interpreted as two paths of activation that are separated by an obstacle and therefore cannot synchronize. This is what can cause arrhythmia, for the myocardium embodiment. So, for said embodiment, a conducting channel that can cause arrhythmia can therefore be any path from healthy tissue H to healthy tissue H through border-zone tissue BZ that is not homotopic to a path from/to the same points that passes only through healthy tissue H.

Definition: Constrained Channel

Based on the above reasoning, a constrained channel, as understood in the present invention, can be defined as follows:

Using all propagating medium (medium through which a wave can propagate), i.e. the above mentioned not-well-defined BZ and well-defined H zones, such a conducting tissue for the myocardium embodiment, as topological space, a constrained channel is defined as a path between two points of a well-defined zone (healthy tissue H for the myocardium embodiment) that is not homotopic to any path that passes through a well-defined zone only (healthy tissue H for the myocardium embodiment).

Note that if this condition is met for a path then it is automatically met for all paths that are homotopic to it. An algorithm that finds all paths that meet the above condition therefore finds a set of equivalence classes of paths instead of single paths. The most interesting representative of this class is the one that most likely follows the path of excitation.

Figure 6:
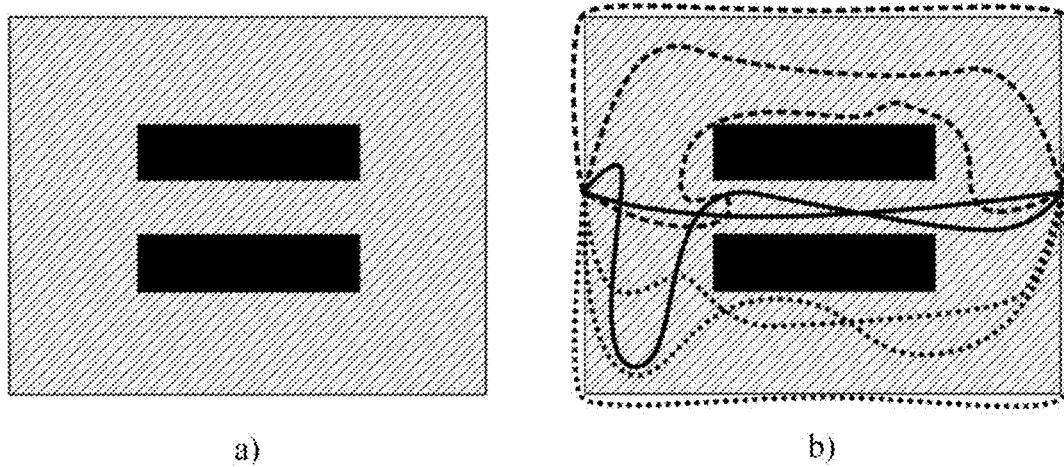
FIG. 6: (a) A patch of not-well-defined zone (shaded) with 2 blocks of core (black) and (b) selected representatives of the 3 homotopy equivalence classes.

The example in FIG. 6 consists of a block of not-well-defined zone (border-zone tissue BZ for the myocardium embodiment) with 2 solid blocks of core (black rectangles) that leave a gap of not-well-defined zones (shaded) between them. The area surrounding the not-well-defined zone is well-defined zone (healthy tissue H for the myocardium embodiment). For a fixed start and end point the two core blocks divide the paths into 3 equivalence classes, the first one (dashed lines) contains paths that pass above the 2 blocks, the second one (solid lines) contains paths that pass through the gap and the third one (dotted lines) contains paths that pass below the 2 blocks.

The only one of those equivalence classes that qualifies for being a constrained channel is the one passing through the gap. Each of the other equivalence classes contains a path that runs through only well-defined zone, particularly the path at the very top for the dashed class and the path at the very bottom for the dotted class. Therefore all their members are homotopic to a path running through only well-defined zone (healthy tissue for the myocardium embodiment).

Algorithmic Solution:

A Brute-Force Approach and its Problems:

The obvious algorithm to detect constrained channels according to the definition given previously is a direct translation of the definition into an algorithm: The definition provides a criterion that can be checked in order to decide if a given path is a constrained channel. So an algorithm can simply check that condition for all possible paths (a finite set, considering we work on discrete data), if the condition itself can be translated into an algorithm. The existence of a homotopic path that runs through only healthy tissue can be checked by probing all possible paths within healthy tissue (again a finite number of paths). Homotopy between two paths can be checked by creating all combinations of elementary homotopies (e.g., using the fact that all paths with the same start and end within a convex space like a voxel or a triangle are homotopic) and checking, if one of them fulfils the criteria to be a homotopy between the two given paths.

While that brute-force approach leads to a theoretically correct algorithm, it's not going to be practically viable for the following reasons:

1. The number of paths that have to be checked is impracticably high. In a continuous space there are an infinite number of paths and even in a discretized version of the space the number of paths grows exponentially in the number of nodes. This applies both to:
    a) The paths that are candidates for constrained channels and for which the constrained channel condition has to be checked
    b) The paths running only through healthy tissue whose homotopy to channel candidates has to be checked
2. Even for a single pair of paths it can very computationally expensive to check the homotopy condition. The mathematical definition uses the existence of a deformation as condition, but doesn't give any hints about how to construct one. Backtracking search can solve this only at exponential cost.

In summary the algorithm would consist of 3 nested loops, each of which has a number of iterations that is exponential in the number of discrete points in the topological space. This rules out the algorithm's use in real-world cases.

Efficient Algorithm:

The algorithm given above can be refined to overcome the computational complexity problems, to obtain the Algorithm 1 mentioned and generically described in a previous section, to identify conducting channels equivalence classes.

Algorithm 1 has as inputs both of the above mentioned topological spaces (H_and_BZ_topo, H_topo), i.e. that including the not-well-defined zone and the well-defined zone (H_and_BZ_topo) and that including only the well-defined zone (H_topo), and generates as output an output set of representatives of channel equivalence classes, one representative path per class, in a topological space.

Algorithm 1 comprises the following steps:

```
1)    Choose two points, Start and End, in single zone
topological space (H_topo)
2)    ChannelCandidates = Equivalence classes in the
combined zones topological space (H_and_BZ_topo),
for paths between said two points
3)    HealthyPaths = Equivalence classes in the single zone
topological space (H_topo), for paths between said two points
4)    For every path bz in ChannelCandidates:
5)        For every path h in HealthyPaths:
6)            If bz is homotopic to h:
7)                Discard bz as constrained channel; advance
                  to next bz
8)            bz is a constrained channel; add it to said output set.
```

Algorithm 1 is still similar to a simple direct translation of the mathematical definition, but includes a number of changes affecting its computational complexity:

- The arbitrary selection of a start and end point of all channel candidates reduces the number of paths to be checked (although not asymptotically). Although this can lead to a loss of detected constrained channels, assuming a well-connected well-defined zone (healthy tissue H for the myocardium embodiment) surrounding an essential part of the not-well define zone and core/obstacle (border-zone and core tissue for the myocardium zone), the differences are confined to the channel's trajectory within well-defined zone (healthy tissue H for the myocardium embodiment) and are therefore of no practical relevance.
- If a path bz is a constrained channel according to the above definition, all paths that are homotopic to bz are constrained channels, too. This follows directly from the transitivity of the equivalence relation. So only one representative of every homotopy equivalence class of paths has to be checked, which drastically reduces the number of candidates.
- Likewise, the iteration over paths that run through only well-defined zone (healthy tissue H for the myocardium embodiment) can be reduced to one representative of every homotopy equivalence class. If a path bz is homotopic to a path h that runs only through well-defined zone, then bz is also homotopic to all paths homotopic to h. This again reduces the number of iterations.
- The homotopy check between two given paths is encapsulated without making assumptions about its internal functioning. This leaves space for optimizations depending on the data structure used to represent the topological space.

Different from the brute-force algorithm, Algorithm 1 is no longer inherently exponential. The number of iterations of its loops is determined solely by the complexity of the structure of the topological spaces and is no longer exponential in the number of nodes.

This doesn't automatically disperse the algorithm's complexity issues. If its problematic sub-algorithms (calculation of equivalence classes and homotopy check) are exponential, this still sets back the whole algorithm. But the critical parts are encapsulated and can be solved separately as solutions to the following well-defined mathematical problems:

1. Calculation of homotopy equivalence classes of paths between given start and end points
2. Checking if two given paths are homotopic Algorithms to efficiently solve those problems for a particular representation of the topological space will be discussed below.

A graphical example of the application of Algorithm 1 is shown in FIG. 7. At FIG. 7a, the two inputs for the algorithm are shown, i.e. the topological spaces H and H+BZ, and also a graphical representation of the execution of the first three lines of the algorithm.

Figure 7A:
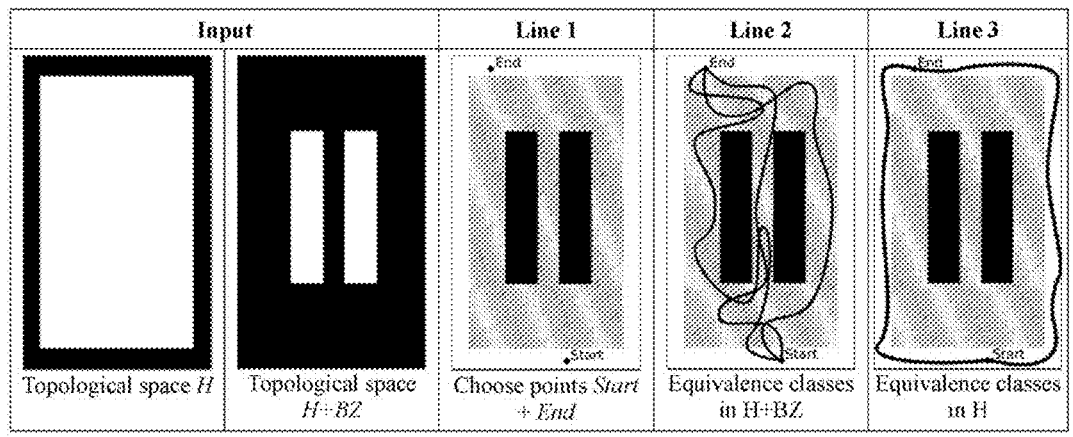
FIGS. 7a-7d show an example of the application of Algorithm 1.
Figure 7B:
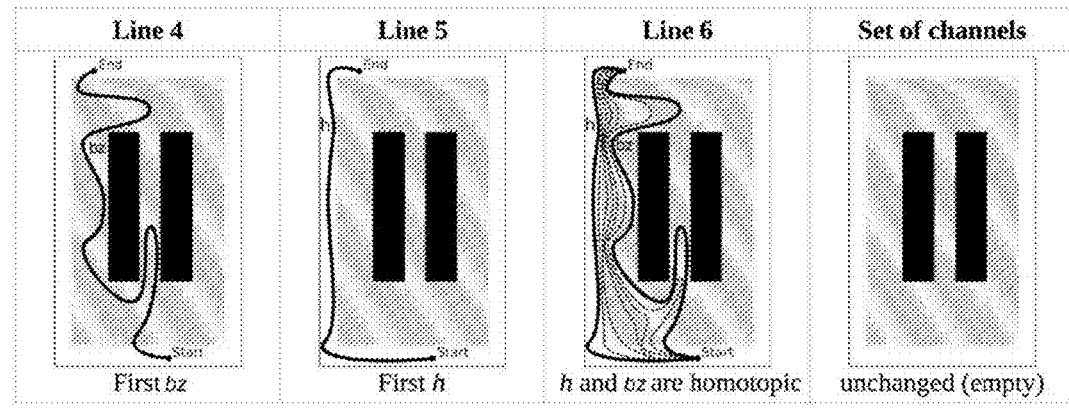

FIG. 7b shows graphical representations of the execution of lines 4, 5 and 6 of Algorithm 1 for a first candidate channel path bz, and a final box (at the right) indicating the state of the set of representative of channel equivalence classes (abbreviated as Set of channels) after each execution sequence, which for this first bz remains unchanged (empty), as said first bz is homotopic to first h.

Figure 7C:
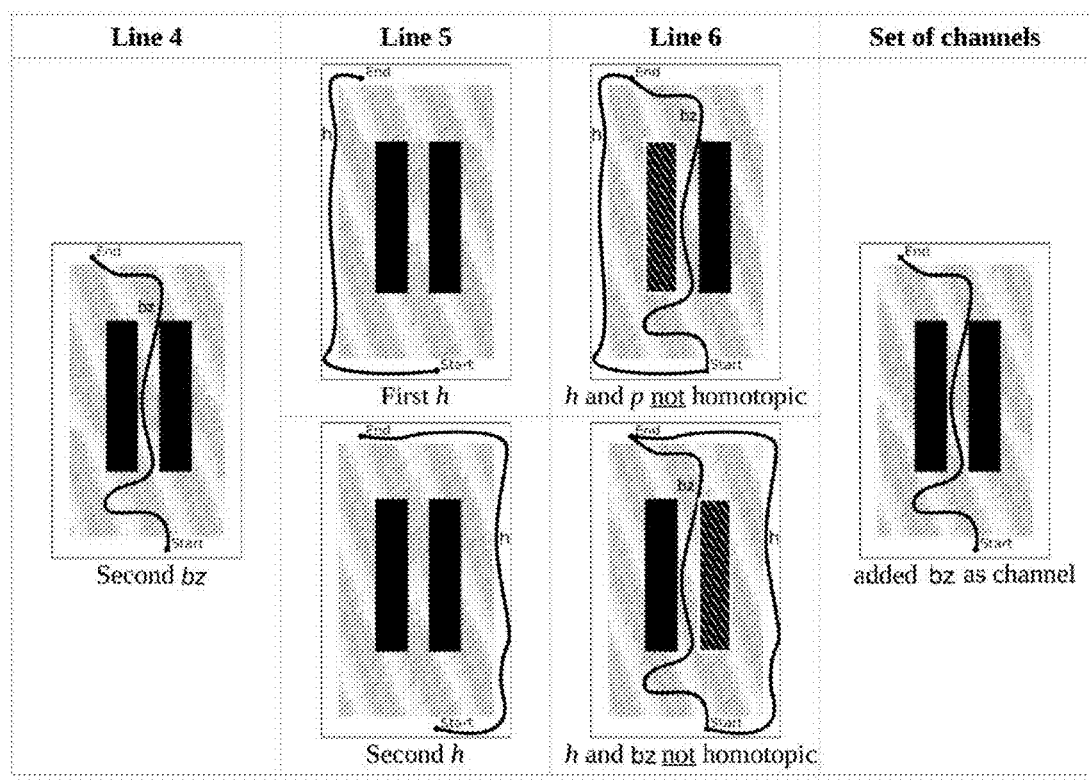

FIG. 7c is similar to FIG. 7b, but for a second candidate channel path bz and first and second healthy paths h, where at the final box it is indicated that said second bz is added as constrained channel (in fact as representative of channel equivalence class), because it is not homotopic to any of first and second healthy paths.

Figure 7D:
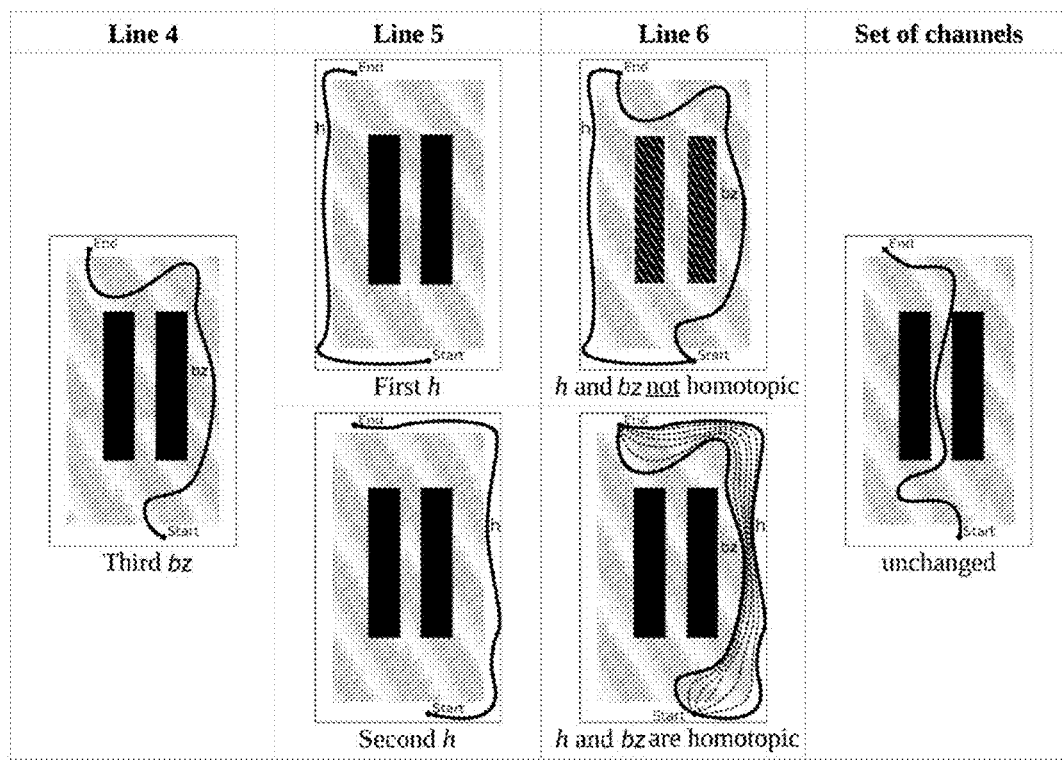

FIG. 7d shows the execution of lines 4, 5 and 6 of Algorithm 1 for a third candidate channel path bz and the first and second healthy paths h, the final box indicating that the set of representative of channel equivalence classes remains unchanged because said third bz is homotopic to one of the healthy paths, particularly to the second healthy path h.

For an embodiment (not illustrated), the method of the present invention comprises collapsing/contracting said single zone topological space (H_topo) such that there is only one healthy path h having as said Start and End points one and the same point, wherein said steps (6), (7) and (8) of Algorithm 1 are performed for said only one healthy path h. When it is known in advance the channel equivalence class homotopic to said only one healthy path h, said ChannelCandidates include all except said homotopic channel equivalence class, and said steps (5), (6) and (7) are omitted, all of the paths bz in Channel Candidates being added to the output set.

For another embodiment (not illustrated), the method comprises implementing a channel optimization algorithm for optimizing said representatives of channel equivalence classes of said output set, said channel optimization algorithm comprising the following steps:

```
1)    For one representative 'c' of every channel equivalence
class (i.e. for every member bz of the output set):
2)        For several subpaths 'subpath' of 'c':
3)            'shortest' = shortest path between start and end
of 'subpath'
4)            If 'shortest' is homotopic to 'subpath'
5)                Modify 'c': Replace 'subpath' by 'shortest'
```

Integrated Solution:

Algorithm 1, presented above, can be used to detect Conducting Channels, or other kind of constrained channels. However, it relies on:

The two topological spaces representing:
 a) all conducting volume: well-defined and not-well-defined zones (Healthy+Border-zone, for the myocardium embodiment); and
 b) well-defined zone (Healthy tissue for the myocardium embodiment).

Sufficiently efficient implementations of topological operations (homotopy check and calculation of homotopy equivalence classes) in those topological spaces.

In order to meet those needs, a pre-processing of the data is be needed. First of all, input data is usually available in some form of geometric space (e.g., volume mesh, 3D image) with assigned functionality information that allows distinguishing between the 3 zones: well-defined zone, not-well-defined zone and a further zone identified in the 3D volume as zone of a third type and corresponding to a core/obstacle (Healthy Tissue zone H, Border-Zone BZ and Core C, for the myocardium embodiment). This data has to be converted to a data structure emphasizing the topological aspect and therefore facilitating topological operations without having to extract the topological features contained in geometrical information in every step. Furthermore a pre-processing of that data will help to make the topological operations more efficient that have to be performed throughout the algorithm.

To that end, the method of the first aspect of the present invention comprises implementing a second algorithm, or Algorithm 2, integrating said first algorithm, said second algorithm having as input data a geometrical space, regarding the 3D volume, with assigned functionality information allowing to perform said identifying of said at least two different sub-volumes (H, BZ) and of said further sub-volume (C), and which generates as output said set of representatives of channel equivalence classes, in a geometrical space.

Algorithm 2 comprises the following steps:
1) (H, BZ, C)=SeparateAccordingToFunctionality(Geometrical Space),
2) H_and_BZ_topo=ConvertToTopologicalSpace(H ∪ BZ),
3) H_topo=ConvertToTopologicalSpace(H),
4) H_and_BZ_topo'=Preprocess TopologicalSpace (H_and_BZ_topo),
5) H_topo'=Preprocess TopologicalSpace(H_topo),
6) ChannelEquivalenceClasses=Algorithm 1(H_topo', H_and_BZ_topo')
7) GeometricChannels=TopologicalToGeometrical (ChannelEquivalence Classes, GeometricalSpace, H_and_BZ_topo').

The function SeparateAccordingToFunctionality separates the geometrical space into 3 disjoint subspaces constituted by said three sub-volumes H, BZ and C, i.e. by the above mentioned three sub-volumes. For a preferred embodiment applied to the identification of conductive channels in the myocardium, or in another organ, H contains all points in the original space that are occupied by Healthy Tissue, BZ points occupied by Border-Zone Tissue and C points occupied by Core Tissue. This operation can be as simple as applying a threshold filter to a 3D volume DE-MRI image.

The function ConvertToTopologicalSpace removes all geometrical overhead and transforms the topological information into a data structure that is more suitable for topological processing. Further below one possible option for that data structure (a connectivity graph with a Local Homotopy Map) and how common 2D and 3D geometrical data can be converted into that data structure is discussed.

The pre-processing done by the function Preprocess TopologicalSpace adds additional auxiliary information to the topological space. That auxiliary information facilitates the topological operations performed in Algorithm 1, especially the homotopy check and the calculation of homotopy equivalence classes. What this auxiliary information is like and how it is generated depends greatly on the chosen data structure for the topological space. That pre-processing for the case of a topological space represented by a connectivity graph and a Local Homotopy Map will be discussed below.

The function TopologicalToGeometric extracts information from the raw channel data, which can be useful, for example, for the clinical intervention, when applied to a Medical or Veterinary application. While Algorithm 1 detects Conducting Channels (or other kind of constrained channels), it does so only in a topological space that does not contain geometric information. Transforming the resulting paths back to the original geometric space is essential for the extraction of information useful for clinical intervention. Furthermore the output of Algorithm 1 consists of one homotopy equivalence classes (set of paths), not one single path per channel. Based on the geometric information, either the member of the equivalence class that best represents the potential stimulation path can be selected or the BZ volume responsible for those stimulation paths can be extracted.

Figure 8:
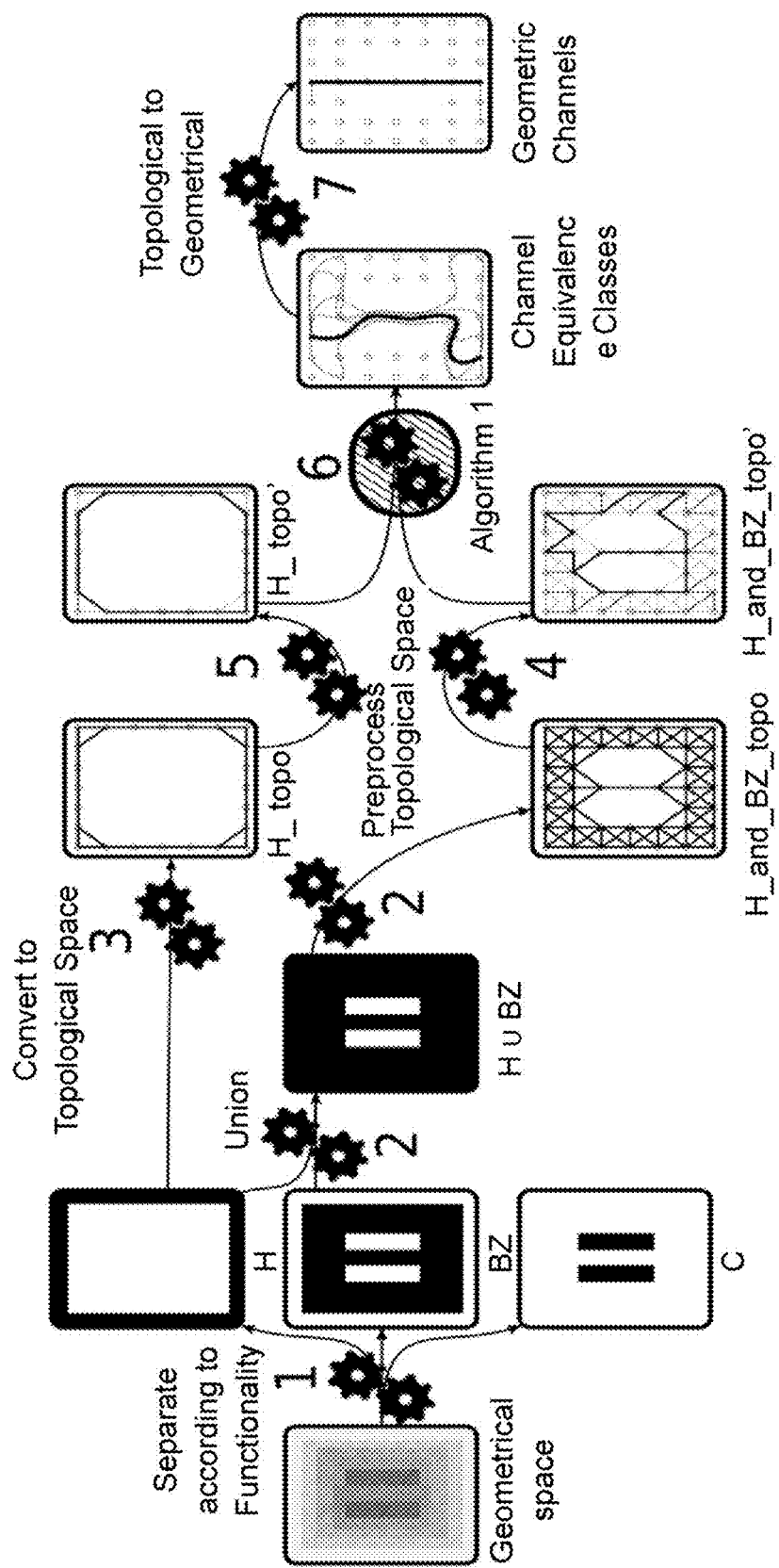
FIG. 8: Workflow of Integrated Solution (Algorithm 2). The rounded rectangles represent data and the gears processing steps (including the embedded Algorithm 1). The numbers correspond to the line numbers in the listing of Algorithm 2.

FIG. 8 shows a workflow of the mentioned Integrated Solution, i.e. of the implementation of Algorithm 2). The rounded rectangles represent data and the gears processing steps (including the embedded Algorithm 1). The numbers correspond to the line numbers in the listing of Algorithm 2.

Efficient Topological Operations:

Discrete Representation of Topological Spaces:

Topological spaces cover essentially the connectivity between the members of a point set. While common representations of geometrical spaces like surface meshes, volume meshes, 2D and 3D images include this information, they focus on the geometric distribution of the points and are optimized for geometric operations. This complicates topological processing and makes its implementation dependant on the data structure used for the geometrical space. So a conversion of the geometrical space to a data structure representing the topology and focussing on the topological operations needed for Algorithm 1 is desired.

As all operations that will be performed in the topological space involve paths, which are essentially lists of edges, an edge-based representation of the topological space is reasonable. A graph containing a discrete set of points as nodes and all direct connections between those points as edges still represents the connectivity and is independent of the geometrical representation (e.g., dimensions—2D vs. 3D; cell types—triangles, cubes, quads, . . . ; images vs. Meshes), but the reduction to a finite set of points created holes in the topological space. Continuous deformations of paths (like in the definition of path homotopy) are not possible in a discrete point set. So that homotopy information has to be added explicitly.

A possible representation of that information can be a Local Homotopy Map. It contains for every edge of the graph a set of paths that are homotopic to it. It is not necessary for that table to be complete and explicitly state all homotopic paths for every edge (which would be of exponential size). Missing homotopies can be deduced by exploiting the transitivity of the homotopy relation, as long as there are enough explicit homotopies to implicitly contain (via deduction) all homotopies.

That kind of homotopy map is called "local" because a typical way of filling it with just enough explicit homotopies is to include all homotopies between edges and paths of the same volume element in the original geometrical representation (e.g. a tetrahedron in a 3D mesh).

The following algorithm, called Algorithm 3, uses this approach to convert a geometrical space into a topological space represented by a graph and a Local Homotopy Map. Thus, Algorithm 3 can be seen as an implementation of function "ConvertToTopologicalSpace" of Algorithm 2. The geometrical space can thereby be represented by any set of nodes (e.g. nodes of a 2D or 3D mesh, pixel centres or voxel centres, etc.) and elements (e.g. tetrahedral, voxels, pixels, etc.) connecting those nodes, as long as the elements are the convex hull of their nodes—which is the case for most linear 2D and 3D meshes as well as 2D and 3D images.

In other words, the above mentioned data structure is, for the here described embodiment, a connectivity graph with a Local Homotopy Map which contains for every edge of the graph a set of paths that are homotopic to it, and the method comprises implementing a third algorithm, said Algorithm 3, for converting the 3D volume or the polygonal mesh with a 3D shape (or a surface obtained therefrom) into said graph and Local Homotopy Map, said third algorithm having as input the geometrical space represented by nodes ns and elements els connecting said nodes ns, as long as the elements els are the convex hull of their nodes ns, and generating as output the topological space represented by said graph and said Local Homotopy Map, or LHM.

Figure 9:
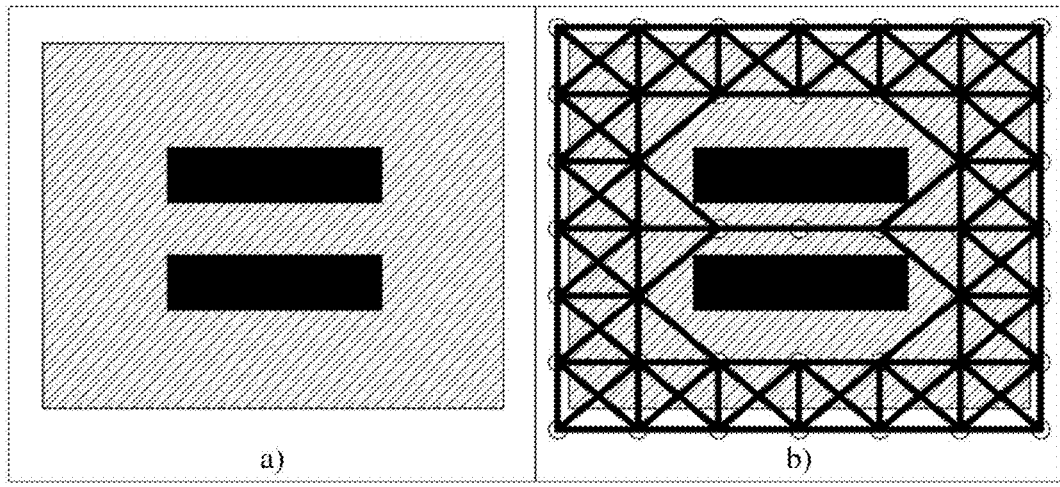
FIG. 9: Transformation of a geometric space with tissue functionality (a) into a graph representation of the topological space (b).

An example of a transformation of a geometric space with tissue functionality (a) into a graph representation of the topological space (b) is given in FIG. 9.

Algorithm 3 comprises the following steps:

| | |
|---|---|
| 1) | For every element el in els: |
| 2) | For every node n1 in nodes(el): |
| 3) | For every node n2 in nodes(el) \ {n1}: |
| 4) | Add nodes n1 and n2 to graph |
| 5) | Add edge (n1, n2) to graph |
| 6) | For every node n3 in nodes(el) \ {n1, n2}: |
| 7) | Add homotopy between (n1, n2) and [n1, n3, n2] to LHM. |

Definition: Homotopy Detection

The method of the present invention also comprises implementing a "Homotopy Detection", which is an algorithm that transforms the following input into the following output:

Input (Topological Space):
 Graph: Set of nodes and edges;
 Local Homotopy Map (LHM): Maps every edge to a list of homotopic paths. This map must have enough entries so that for every edge e and every path p homotopic to e the homotopy between e and p can be deduced by the entries of the LHM using the mathematical properties of homotopies (e.g. transitivity).

Output:
 The above mentioned (in the description of Algorithm 2) additional auxiliary information, constituted by the following two data structures:
  Skeleton: A subset of edges (from the edges of said graph) meeting the conditions below;
  Transitive Homotopy Map (THM): A table that maps every edge that is not part of the skeleton to one homotopic path in a way that is compatible with the conditions below.

Conditions:
 1. No cyclic references in THM: The transitive hull of the relation dependsOn defined by dependsOn(a, b)⇔b∈THM[a] is not allowed to have any reflexive entries.
 2. References in THM have to be covered by real homotopies (represented by the LHM): The THM is allowed to map an edge e to a path p, only if it can be deduced by the LHM and the mathematical properties of homotopy (e.g. transitivity) that e is homotopic to p.
 3. Skeleton has to be minimal, or as minimal as possible, among sets meeting conditions 1 and 2.

Notes on the Definition:

The LHM according to its above definition doesn't have to contain a complete list of all homotopic paths to every given edges. Instead it is enough to include just as many homotopies so that all the other homotopies follow automatically from it.

The LHM is called "Local Homotopy Map" because it is practical to include only the homotopies between edges and paths whose nodes are all neighbours. For example, when converting a volume to the input format for the Homotopy Detection and your volume is represented by convex elements spanned by a finite number of nodes (e.g. the cubes between every 8 neighbouring voxel centres in a 3D mesh, the triangles in a simplex surface mesh, the tetrahedral in a simplex volume mesh), it can be proven that a LHM created by Algorithm 3 "Convert Volume to Graph" fulfils the conditions.

Application of the Homotopy Detection:

The "Homotopy Detection" can be called "Homotopy Detection" because its outputs, the Skeleton and the Transitive Homotopy Map, significantly simplify 2 technical problems of homotopies: The problem of checking, if two given paths are homotopic (problem 2 of the constrained channel definition), as well as the finding of homotopy equivalence classes (in order to reduce the number of paths to take into consideration, problem 1 of the constrained channel definition).

Check Homotopy Between Two Given Paths:

In order to check, if two arbitrary given paths p1 and p2 in a given topological space are homotopic, the existence of a homotopy between them has to be proved (e.g. by finding a concrete homotopy) or refuted (e.g. by trying all possible functions and showing that none is a homotopy between the two paths). This can be done using the homotopies in the LHM by applying a recursive backtracking search starting from p1 and hoping to arrive at p2. But if the algorithm just blindly applies homotopies from the LHM, the effort to do so is exponential in the number of edges. So a more directed way to combine the homotopies from the LHM is necessary.

This is where the THM helps. Whereas the LHM contained a list of homotopies for every edge, the THM only contains a single homotopy for every edge—the one that guides us towards the Skeleton. So instead of randomly applying homotopies (and going backwards, if we chose badly) to find a sequence from p1 to p2, one can start from both p1 and p2 and use the homotopies from the THM to find homotopic paths p1' and p2' that are both in the Skeleton, what is done, for an embodiment, by means of a Skeleton projection algorithm, or Algorithm 4, for projecting paths p1, p2 which are, in general, out of the Skeleton, but inside the graph, towards paths p1', p2' inside the Skeleton, said Algorithm 4 having path p as input and comprising the following steps:

| | |
|---|---|
| 1) | while not all edges in p are in skeleton: |
| 2) | for every edge e in p: |
| 3) | if edge e not in skeleton: |
| 4) | modify p: Replace e by THM[e] |
| 5) | return p' |

In said Algorithm 4, the termination of the while loop in instruction (1) follows directly from the requirement that the THM must not contain any cyclic references. This limits the while loop to a number of iterations not higher than the number of edges in the graph.

Proof by contradiction: Let's assume the loop has more iterations than the number of edges in the graph. Then in one replacement sequence there would have to be a repetition. But this would imply a cycle in the THM—a contradiction to the fact that the THM has to be cycle-free by definition of the output of the "Homotopy Detection".

Figure 10:
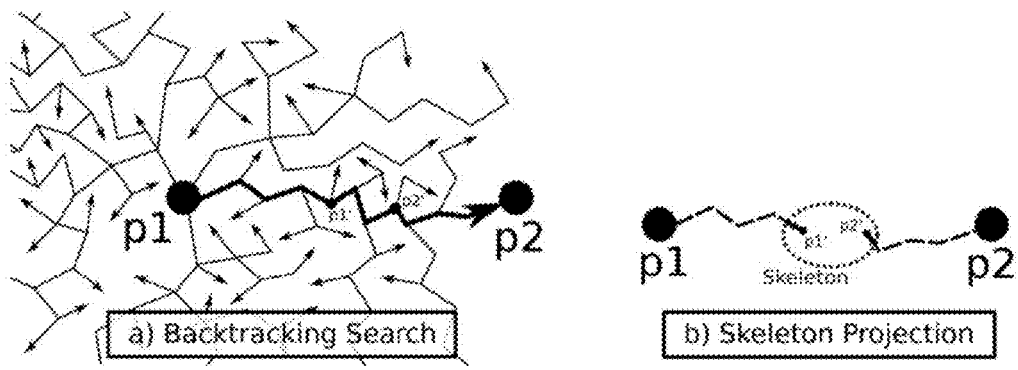
FIG. 10: Search trace for backtracking search (left) and deterministic search towards a defined area (right).
Figure 10:
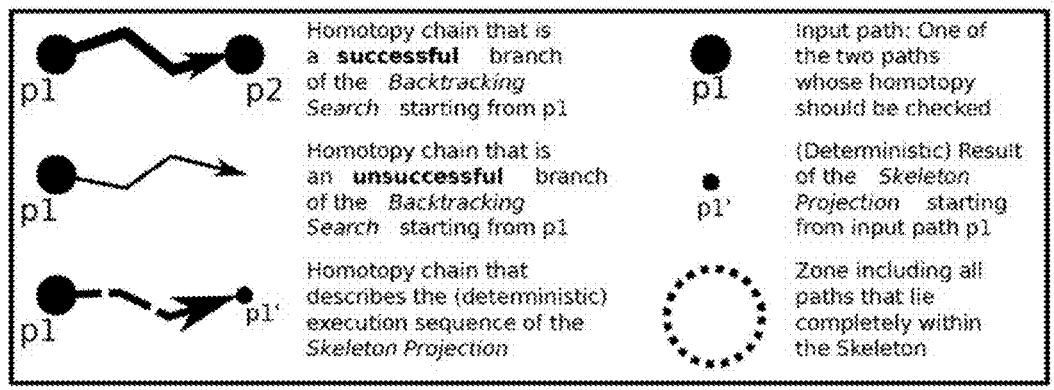

FIG. 10 illustrates the benefit of the THM together with Skeleton Projection (Algorithm 4) in the context of finding homotopies between paths, compared to the simpler, but more expensive backtracking search using only the LHM. While the backtracking search in a) has to traverse many unsuccessful search branches until it finds the homotopy, the Skeleton Projections in b) find large parts of the homotopy in a deterministic way.

Unfortunately the Skeleton is still too big to guarantee success: In order to guarantee that the homotopy search starting from two homotopic paths p1 and p2 arrives at the same path p' in the Skeleton, no 2 paths in the Skeleton can be homotopic. But this is not the case, as the example in FIG. 10 shows: Both paths p1' and p2' (i.e. paths resulting from the projection of paths p1 and p2) lie completely within the skeleton, are homotopic and not equal.

But if the space is further restricted by excluding paths that contain "reversal points" (a point where the same edge is passed in one direction and immediately afterwards in the contrary direction), one can indeed guarantee that the homotopy search starting from homotopic paths p1 and p2 always arrives at the same path. That's carried out by implementing the application of a Remove reversal points algorithm, or Algorithm 5, to projected paths p1', p2' inside the Skeleton, for excluding paths that contain reversal points, to obtain paths projected into the Skeleton and without reversal points p1", p2", wherein said Algorithm 5 has path p' as input and comprises the following steps:

| | |
|---|---|
| 1) | do: |
| 2) | find any subpath in p' that matches the pattern [n1, n2, n1] |
| 3) | modify p': replace the subpath [n1, n2, n1] by [n1] |
| 4) | while there are changes in p' |
| 5) | return p" |

Thanks to this fact one can check homotopy between 2 paths by doing the Skeleton Projection and Removal of Reversal Points for both paths and check, if the results are equal. This is performed by the next Homotopy check algorithm, or Algorithm 6, having as inputs paths which are, in general, out of the Skeleton (p1, p2), and also the Skeleton and the THM, and comprising the following steps:

1) p1'=SkeletonProjection(p1)
2) p2'=SkeletonProjection(p2)
3) p1"=RemoveReversalPoints(p1')
4) p2"=RemoveReversalPoints(p2')
5) Return p1"==p2"

where steps (1) and (2) implement the application of Algorithm 4 for, respectively, projecting paths (p1, p2) which are, in general, out of the Skeleton but inside the graph, towards paths (p1', p2') inside the Skeleton, and steps (3) and (4) implement the application of Algorithm 5 to said projected paths (p1', p2') inside the Skeleton, for excluding paths that contain reversal points, and wherein the command Return p1"==p2" of step (5) of Algorithm 6 performs said homotopy checking by checking if the latter paths (p1", p2") (i.e. those projected into the Skeleton and without reversal points) are equal.

For a preferred embodiment, one of said paths projected into the Skeleton and without reversal points p1" is one of said channel candidates bz and the other p2" is one path h running only through the well-defined zone. Hence if step (5) of Algorithm 6 gives as a result that bz=h, said bz is not identified as a constrained channel.

Besides the application related to said preferred embodiment, Algorithm 6 has other applications, for other embodiments. It can be applied, for example, to the above described "Channel Optimization", to perform the homotopy check between 'shortest' and 'subpath' (see Line 4) of Algorithm 4).

FIG. 11 graphically shows the implementation of the steps of Algorithm 6, i.e. the "Skeleton Projection", the "Remove Reversal Points" and the final comparison of the equality of the obtained paths, for two different cases.

A first case includes paths p1 and p2, which, as shown in the Figure, are projected into the Skeleton as paths p1', p2' and become paths p1", p2" after their reversal points have been removed, and the result of their comparison shows that they are homotopic paths, i.e. that p1"=p2".

A second case includes paths q1 and q2, which, as shown in the Figure are projected into the Skeleton as paths q1', q2' and become paths q1", q2" after their reversal points have been removed, and the result of their comparison shows that they are non-homotopic paths, i.e. that q1"≠q2".

Figure 11A:
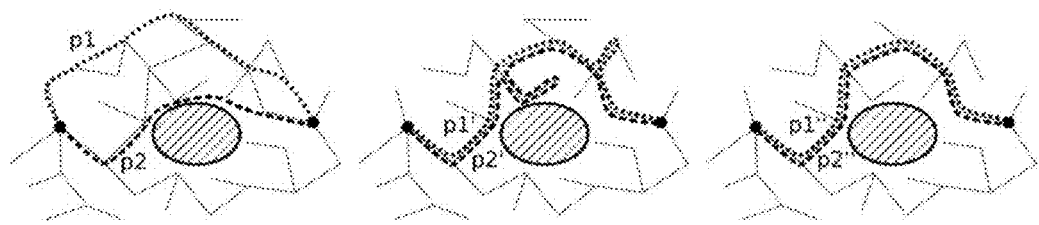
FIG. 11a: Combination of "Skeleton Projection" and "Remove Reversal Points" starting from both paths p1 and p2 to find a homotopy from both p1 and p2 to p (for case i)) or from both paths q1 and q2 to q (for case ii)) and therefore a homotopy between p1 and p2 (for case i)) and a homotopy between q1 and q2 (for case ii)), the latter not found because q1 and q2 are non-homotopic paths.
Figure 11A:
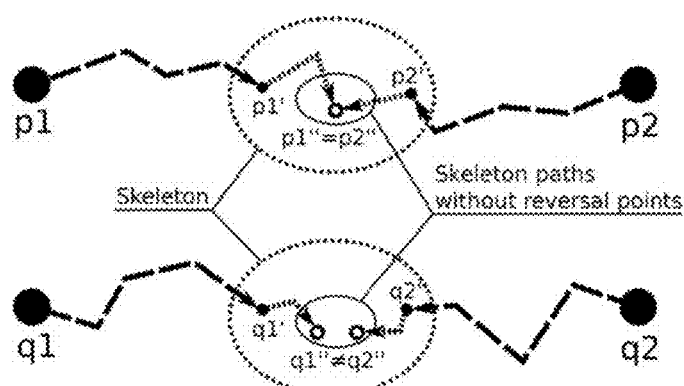
Figure 11A:
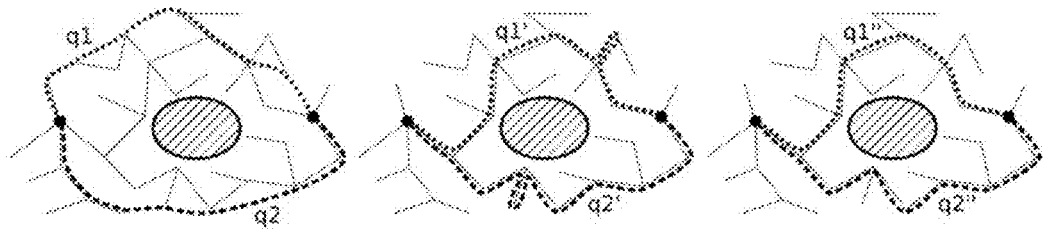
Figure 11B:
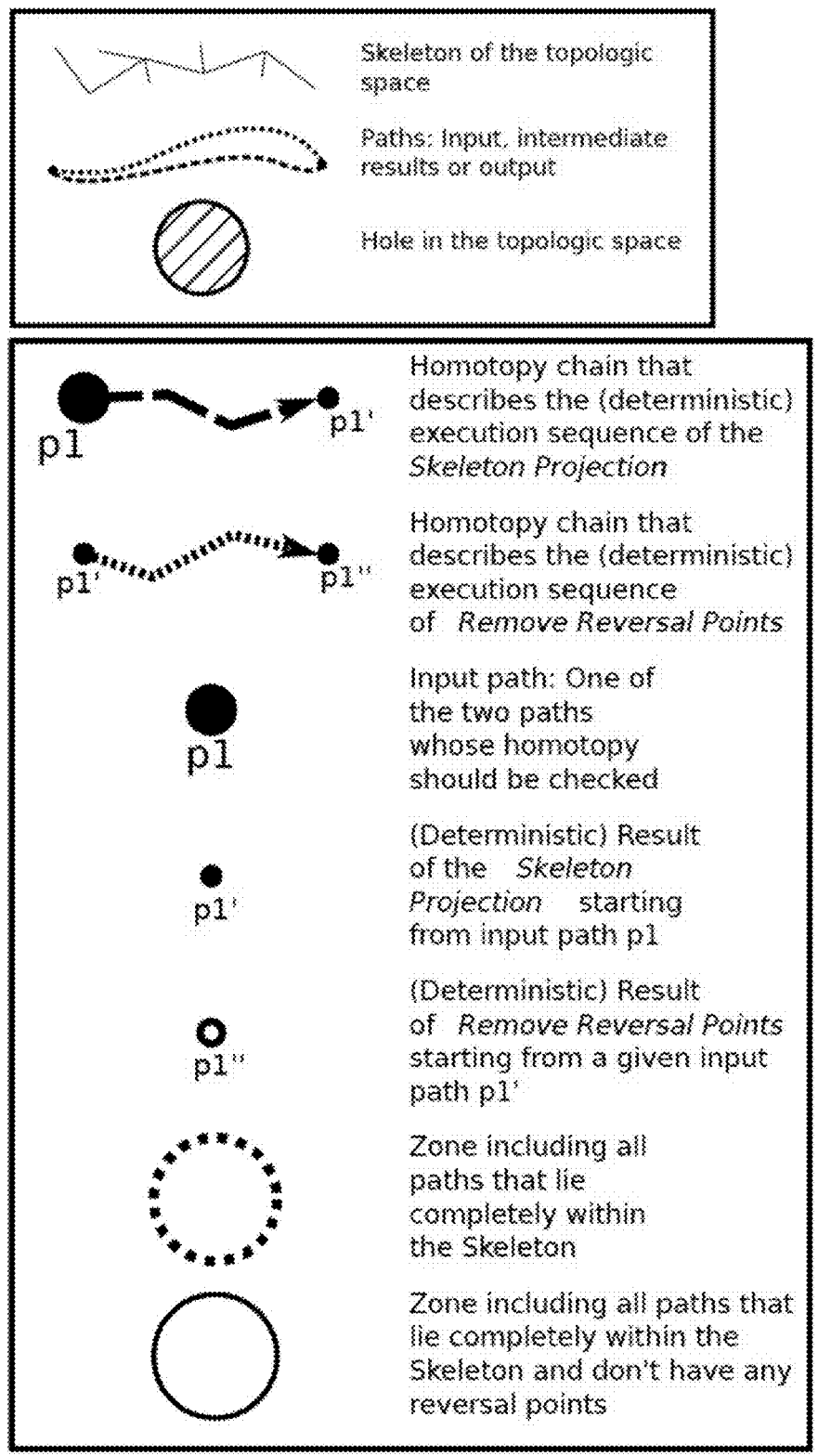

FIG. 11b show the legends of the elements shown in FIG. 11a.

Figure 12A:
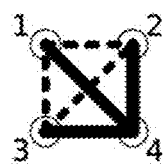
Figure 12A:
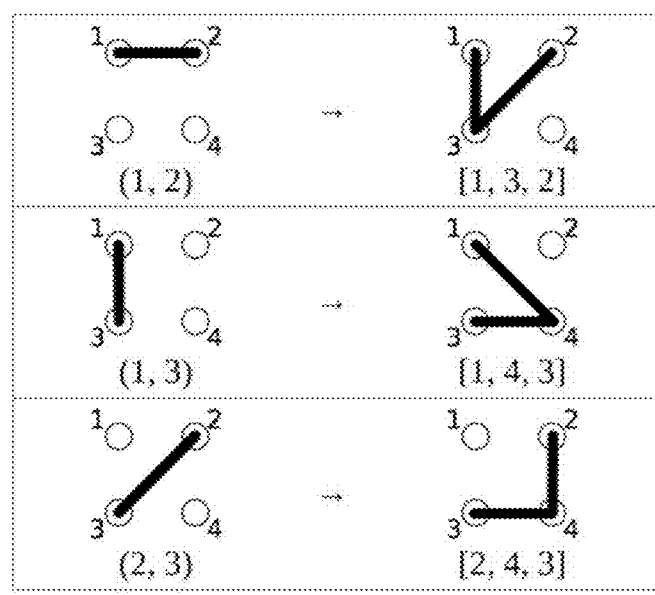
Figure 12A:
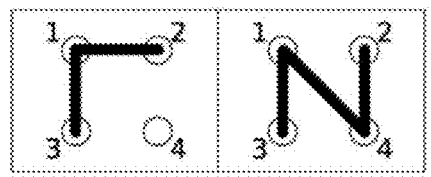

FIG. 12 shows another example of the application of Algorithm 6, in this case by means of a table.

Figure 12B:
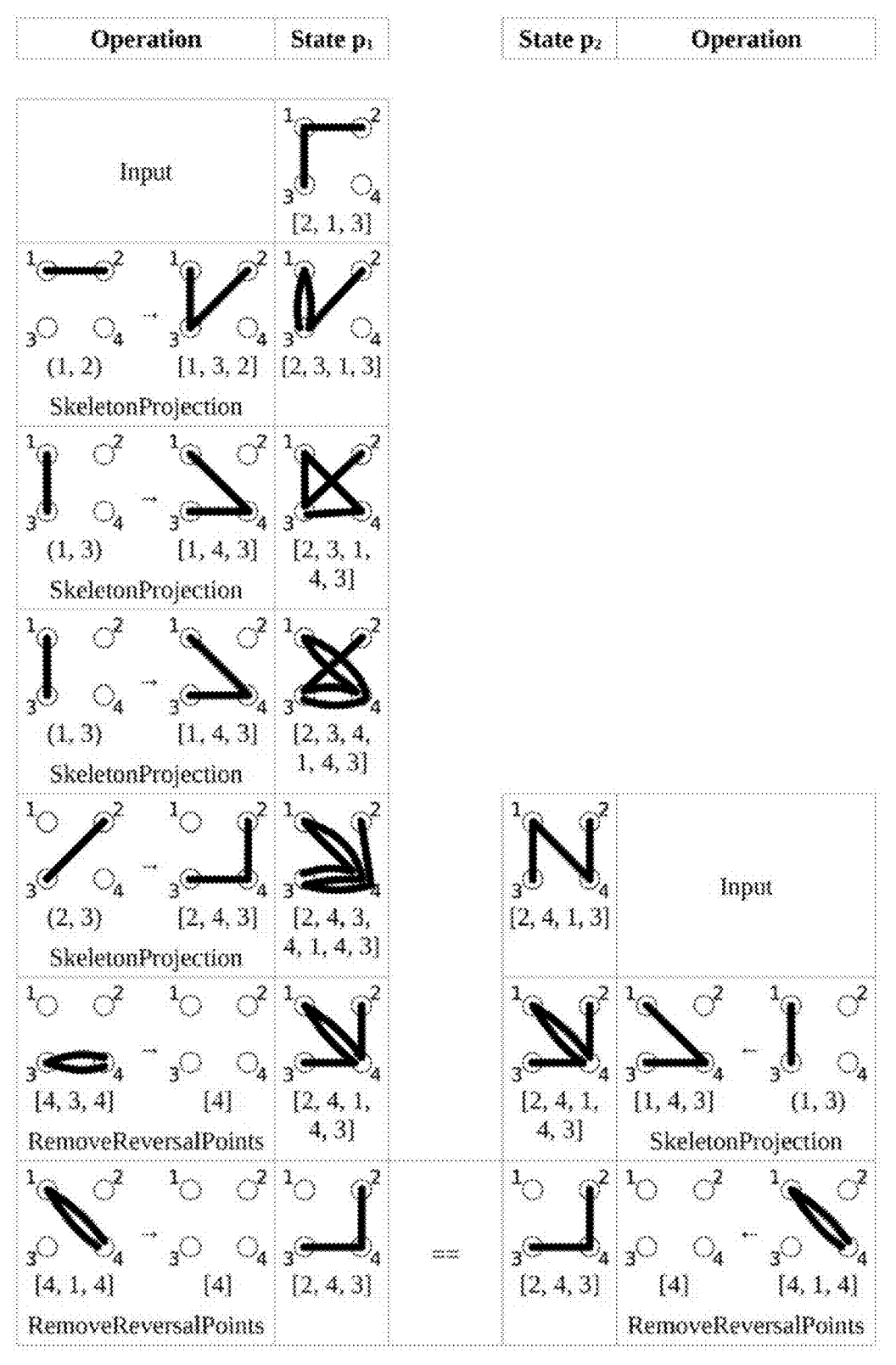

FIG. 12a show the inputs for the algorithm are shown, i.e.:
- a Skeleton having three edges ((1, 4), (2, 4) and (3, 4)) depicted in solid lines,
- a THM mapping every edge that is not part of the skeleton ((1, 2), (1, 3) and (2, 3), shown in dotted lines in the Skeleton) to one homotopic path, and
- two given paths p1, p2 whose homotopy must be checked;

FIG. 12b is a table which graphically shows the different operations performed on paths p1, p2 according to Algorithm 6, including the skeleton projections and the removing of reversal points for both paths (left columns for p1 and right columns for p2) and the equality checking (central box at the bottom line of the shown table) of the finally obtained paths.

The columns labelled as "state p1" and "state p2" include the paths before any operation is performed thereon, i.e. paths p1 and p2, in the first member of the columns, and below them the paths obtained after the execution of the different operations, i.e. p1' and p2' after the skeleton projections, and p1" and p2" after the remove of reversal points.

It can be seen at the last row of the table of FIG. 12b that p1" and p2" are equal, as both refer to the same path [2, 4, 3], and thus they are homotopic paths.

Find Homotopy Equivalence Classes:

It has been shown above that if the definition of a constrained channel is fulfilled for one path then it is automatically fulfilled for all paths homotopic to it. So when looking for a constrained channel there is no need to check all possible paths from well-defined zone to well-defined zone via not-well-defined zone (i.e. from Healthy to Healthy via Border-Zone tissue, for the myocardium embodiment). Instead, it is enough to check one representant of each equivalence class that contains a path fulfilling the conditions. Note that the search can also be limited to paths without reversal points because every path with reversal point has a homotopic path without reversal points in the Skeleton (Proof: Termination of Algorithm 5 "RemoveReversalPoints", shown earlier).

This reduces significantly the number of paths to check, especially when considering the following fact:

For every possible path in the graph there exists a homotopic path in the Skeleton. This follows directly from the definition of Algorithm 4 "Skeleton Projection" (modifies a given path while maintaining homotopy to the original path until all edges are within the Skeleton) and its termination (proved earlier in this section).

Figure 13:
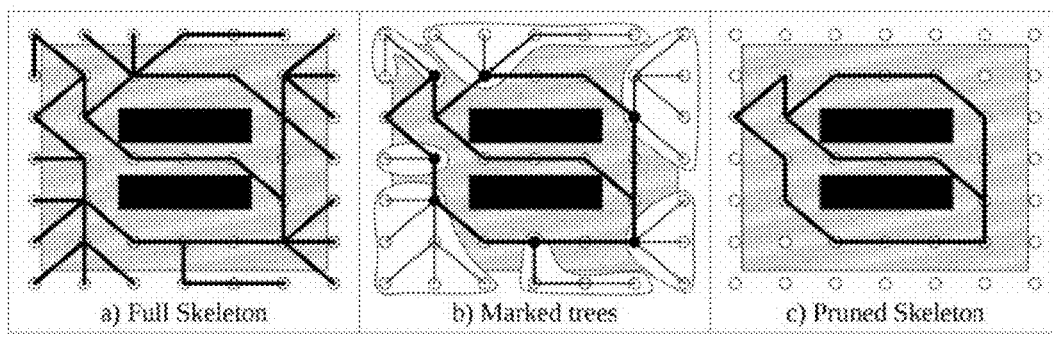
FIG. 13: Removal of trees during the pruning process: a) full Skeleton, b) marked trees and c) pruned Skeleton. Shaded rectangle is a not-well-defined zone, the surrounding white corresponds to well-defined zone and the black rectangles to non-propagating cores/obstacles.

So instead of checking all possible paths from Healthy to Healthy in the full graph, only those within the Skeleton have to be checked. This is an important reduction because, although the number of edges in the Skeleton is statistically only by a small fixed factor (depending only on the discretization method) smaller than the number of edges in the original graph, most of those edges are part of trees that are only connected to the rest of the graph at their roots and can therefore not contribute to any path from well-defined zone to well-defined zone that has to be cyclic and without reversal points. FIG. 13 shows an example with those irrelevant trees removed, by means of a pruning process, that gives an immediate visual idea of the 3 homotopy equivalence classes: Paths that travel from one side to the other above, between and below the obstacles.

Depending on the embodiment, this pruning process can be applied or not according to the method of the present invention, in order to prune the Skeleton to be used in Algorithm 6, as said algorithm works also with an unpruned Skeleton.

First Implementation of the Homotopy Detection:
Iterative Removal of Edges from Skeleton:

In order to build the Skeleton and the THM, the method comprises, for an embodiment, using an Iterative Edge Removal Algorithm, or Algorithm 7, using as inputs the graph and the LHM, said Algorithm 7 comprising the following steps:

| | |
|---|---|
| 1) | Initialize the skeleton as set of all edges in the input graph |
| 2) | Start with an empty THM |
| 3) | For every edge e in the skeleton in random order: |
| 4) | While the edge e is part of the skeleton: |
| 5) | Choose a homotopic path p to e from list LHM[e] |
| 6a) | p' = SkeletonProjection(p) |
| 6b) | p" = RemoveReversalPoints(p') |
| 7) | If p" does not contain the original edge e: |
| 8) | Remove e from the skeleton |
| 9) | Add entry [e -> p"] to THM |
| 10) | Return (Skeleton, THM). |

The algorithm 7 returns a Skeleton and a THM that fulfil two of the three criteria given above in the definition of "Homotopy Detection": There are no cyclic references in the THM (condition 1) and every reference in the THM is covered by a real homotopy represented by the LHM (condition 2).

Proof: Conditions 1 and 2 as Loop Invariants:

Proof: Both conditions are invariants of the "While" loop in instruction (4) of Algorithm 7 and therefore are automatically invariants of the "For" loop in instruction (3). The conditions are obviously met at the beginning of the algorithm: The empty THM cannot contain any cyclic references and all references that there are in the THM (there are none!) are covered by real homotopies. So it has to be proven that the 2 conditions are met at the end of every While loop iteration, assuming they were met at the beginning of the iteration. There are 2 cases: Either the condition (7) is false. Then no change is made to the THM nor to the Skeleton; so, the 2 conditions wanted to be proved remain true. Or the condition (7) is true. In this case the entry [e->p"] is added to the THM. This entry is covered by a real homotopy because p" was obtained by:

Replacement of e with a homotopic path from LHM: Homotopic according to LHM.

Iterative replacement of its homotopic sub-paths: Maintaining homotopy according to THM. This implies that homotopies according to LHM are maintained because we assumed that at the beginning of the iteration all references in THM are covered by homotopies in LHM.

RemoveReversal Points: Always maintaining homotopy by its nature (independently of LHM).

Furthermore, there cannot be any cyclic reference in THM at the end of the iteration because there one can assume that there was no cyclic reference in THM at the beginning of the iteration and the new entry [e->p'] cannot close any cycles because of the condition (7):

If [e->p"] was to close a cycle then there must have been a reference chain [e1-> . . . ->e] starting from an edge e1 in p" in THM before. But all edges in p" are part of the skeleton and therefore don't have any real references in THM. The only possibility left is the trivial (0-length) reference chain [e1] with e1=e. This means that the original edge e is part of p". But this case is checked and avoided by condition (7).

Condition 3: Minimality

Condition 3, the minimality of the skeleton among those that fulfil conditions 1 and 2, is not guaranteed for Algorithm 7. The result is minimal only in the sense that using that particular technique no more edges can be removed from the skeleton. But—depending on the complexity of the input and your luck when choosing the random order in the main loop—the result may not be minimal among those fulfilling conditions 1 and 2. So Algorithm 7 can only be seen as a heuristics for "Homotopy Detection".

This problem can be dealt with by executing Algorithm 7 repeatedly with different random orders for the "For" loop in line (3) and merging the results. Doing this often enough is guaranteed to lead to a minimal skeleton eventually. In practice, empiric tests have shown that even a small number of repetitions already lead to a minimal skeleton.

The effects of working with a non-minimal skeleton while assuming minimality can be seen as working with a too fine homotopy equivalence relation (i.e. paths that are homotopic in reality will be treated as non-homotopic), but doesn't have any other negative consequences. This could cause false positives in the constrained channel detection, but, in practice, said possible false positives can be easily removed by further processing.

To sum up, in practice, the application of the method of the present invention does not generate false positives because it comprises applying the technique of executing the above described Iterative Edge Removal Algorithm, or Algorithm 7, several times and merge the results. However, a guarantee of a 100% of probabilities of not having any false positive, i.e. of achieving a minimal Skeleton, is reached for a very high number of iterations, that probabilities percentage increasing with each iteration. Then, a trade-off between the probability percentage of avoiding false positives and the cost of the required resources and processing time must therefore be reached.

Figure 14A:
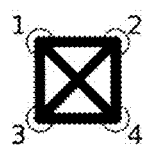
Figure 14B:
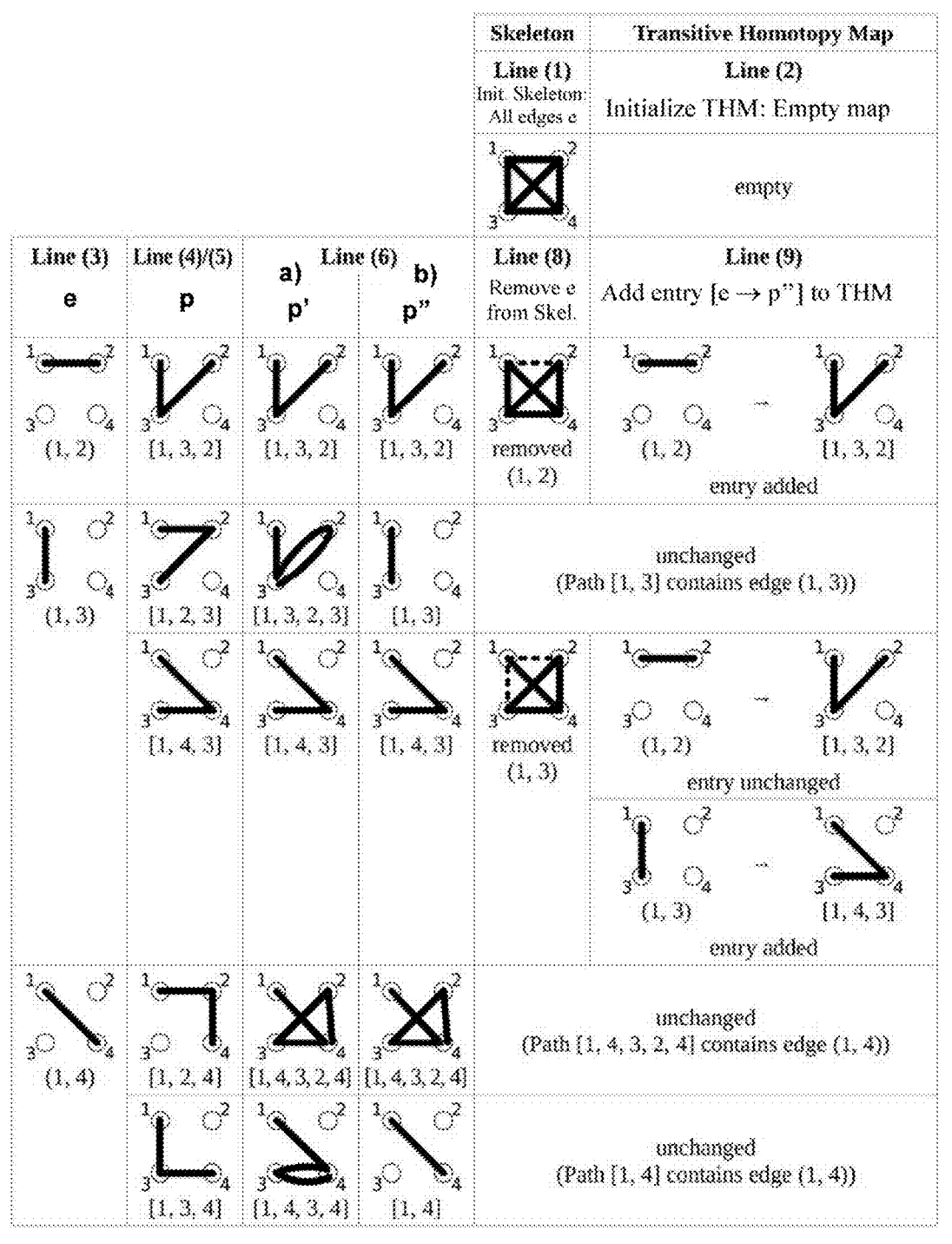

FIGS. 14a to 14c show an example of the implementation of Algorithm 7.

Particularly, FIG. 14a shows the inputs of said algorithm, i.e.:
- a graph having six edges ((1, 2), (1, 3), (1, 4), (2, 3), (2, 4) and (3, 4)) depicted in solid lines, and
- a LHM which contains for every edge of the graph a set of paths that are homotopic to it.

FIGS. 14b and 14c are tables which graphically show the execution of the different lines of Algorithm 7, starting with a Skeleton including all edges, at Line (1), and an empty THM, at Line (2), and continuing by applying the operation of Line (3) for selecting every edges e, the operation of Lines (4)/(5) to choose, for every edge e in the skeleton, an homotopic path p in the LHM, the execution of Line (6a) to project p into the skeleton as p', the execution of Line (6b) to remove the reversal points of p' to obtain p", and if the condition of Line (7) is met the execution of Line (8) to remove e from skeleton (removed edges e are shown in dashed lines) and the execution of Line (9) to add an entry mapping e to p" to the THM. If the condition of Line (7) is not met, then both the skeleton and the THM remain unchanged. For the illustrated embodiment, the results of Line (10), i.e. the obtained skeleton and THM, are those shown in FIG. 12a.

Second Implementation of the Homotopy Detection:

The method of the present invention comprises, as an alternative to the above described Algorithm 7, i.e. to the algorithm for Iterative removal of edges from skeleton, in order to build the Skeleton and the THM, for another embodiment, using a Null-Homotopic Cycle Removal Algorithm, or Algorithm 8, using the same inputs as Algorithm 7, i.e. the graph and the LHM.

Figure 16:
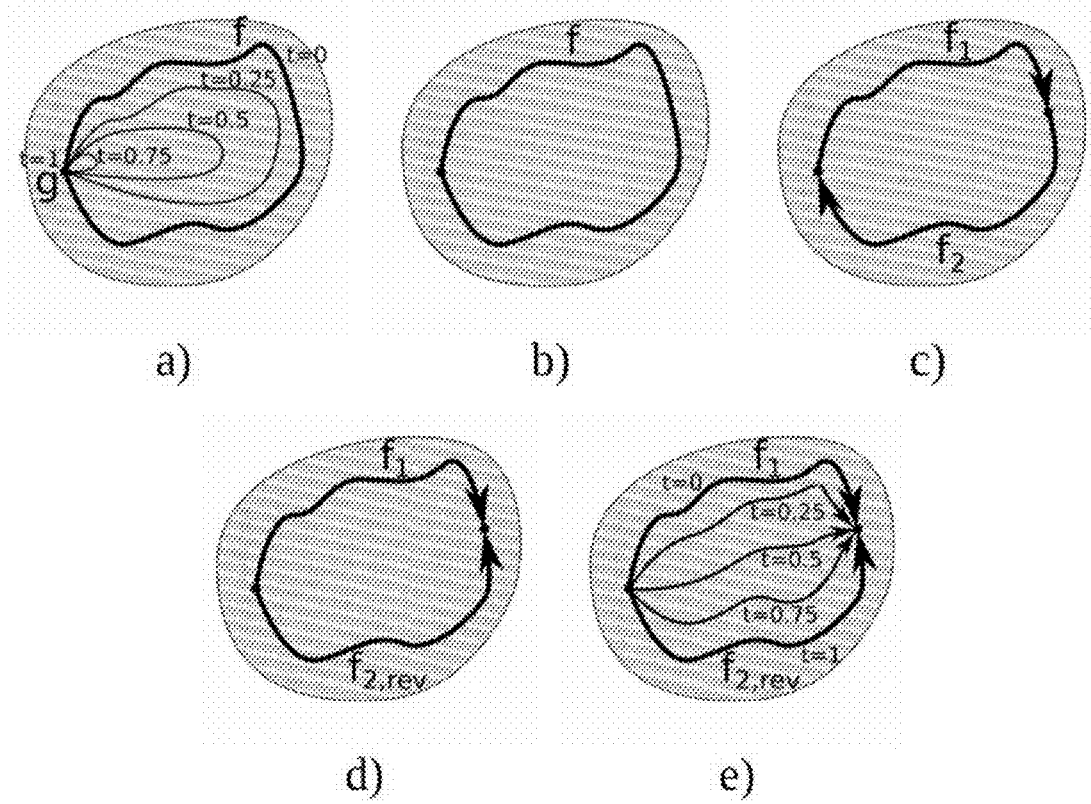
FIG. 16 schematically shows the relationship between null-homotopic paths and pairs of homotopic paths. View a) shows a null-homotopic path f and the homotopy between f and the constant path g. Views b) to e) show the conversion of a null-homotopic path f to a pair of homotopic paths f1 and f2,rev, starting from the complete null-homotopic path in b), splitting it into components f1 and f2 in c), reversing one component in d) and a homotopy between the resulting paths in e).

Before describing Algorithm 8, a description of the concepts on which said algorithm is based is next given with reference to FIG. 16.

Definition of Null-Homotopic Paths

A null-homotopic path is a path that is homotopic to a constant path (containing only one point). Due to the restriction that both the start and end point of both paths have to match for homotopy, only cyclic paths can be homotopic to constant paths. But not every cyclic path is null-homotopic, those surrounding a hole in the topological space are not. FIG. 16a shows an example of a null homotopic path f and its homotopic constant counterpart g.

Null-homotopic paths can be useful to find homotopic paths of arbitrary length. Splitting a null-homotopic path and reversing one of its components results in two homotopic paths (see FIG. 16b to e). The choice of the splitting point allows regulating the length of both paths. This allows splitting a null-homotopic path into one path containing only one edge and another path homotopic to that edge—a suitable pair for a THM entry.

Looking at it the other way round, two homotopic paths can be used to create a null-homotopic path by reversing one of the paths and concatenating them. The two homotopic can come e.g. from a LHM.

This way, null-homotopic paths can be the missing link between LHM entries and THM entries.

Algorithm 8 Comprises the Following Steps:

1) Initialize the Skeleton as set of all edges in the input graph
2) Start with an empty Transitive Homotopy Map (THM)
3) Start with an empty queue
4) For each entry [edge → alternativePath] in LHM:
5)   cycle = [edge] ++ Reverse(alternativePath)
6)   enqueue(queue, cycle)
7) While queue not empty:
8)   cycle = pop(queue)
9)   skeletonCycle = RemoveReversalPoints(SkeletonProjection(cycle))
10)  If there is an edge singleOccuranceEdge that occurs exactly once in skeletonCycle:
11)    Divide skeletonCycle: Calculate prefix and suffix such that prefix ++ [singleOccuranceEdge] ++ suffix==skeletonCycle
12)    alternativePath = Reverse(suffix ++ prefix)
13)    Remove singleOccuranceEdge from the Skeleton
14)    Add entry [singleOccuranceEdge → alternativePath] to THM
15)  Else:
16)    For each edge edgeToReplace in cycle:
17)      For each edgeAlternative in LHM[edgeToReplace]:
18)        alternativeCycle =
             Replace edge ToReplace by edgeAlternative
             in cycle
19)        enqueue(queue, alternativeCycle)
20)    enqueue(queue, cycle)
21) Return (Skeleton, THM)

The function Reverse calculates the reverse path to a given path. The operator ++ concatenates two given paths.

The variable queue is a FIFO queue that contains all null-homotopic cycles whose coverage by the THM is still pending or unchecked. The operation enqueue appends a new object at the end of the list. The operation pop removes the first element of the list and returns it.

At the beginning the queue contains all null-homotopic cycles that can be deduced directly from the Local Homotopy Map. Each of those cycles is projected into the current Skeleton and cleared from reversal points. The resulting cycle is then still null-homotopic and can help to create a new THM entry that covers the original local homotopy (lines 11 to 14 of Algorithm 8). In case that isn't possible—which only happens in pathological cases—then the Local Homotopy Map is used to construct alternative null-homotopic cycles that may be easier to translate into THM entries. The newly constructed cycles as well as the original cycle are enqueued for processing.

Null-Homotopic Cycle Removal as Homotopy Detection:

Condition 1: No Cyclic References

The THM target alternativePath doesn't include the edge singleOccuranceEdge because there is no second occurance of singleOccuranceEdge in skeletonCycle. This ensured that there are no directly cyclic entries in the THM. The fact that all edges of alternativePath are part of the Skeleton at insertion time rules out indirectly cyclic entries. This satisfies condition 1 of the Homotopy Detection.

Condition 2: THM Entries Covered by Real Homotopies (Represented by the LHM)

Every path in the queue is null-homotopic: The cycles that are originally inserted in line 6 are null-homotopic because each of them consists of the concatenation of a first path ([edge]) and the reverse of a second path (alternativePath) that is homotopic to the first path. The cycles that are inserted in line 19 of Algorithm 8 are null-homotopic because they are derived from a null-homotopic cycle (coming from the queue) by only homotopic modifications. The cycles that are inserted in line 20 of Algorithm 8 are entries that have been in the queue before and therefore are null-homotopic, too.

Each path skeletonCycle is null-homotopic: As the outputs of SkeletonProjection and RemoveReversalPoints are homotopic to their respective inputs, the path skeletonCycle is homotopic to cycle (coming from the queue and therefore null-homotopic) and is therefore null-homotopic, too.

The edge singleOccuranceEdge and the path alternativePath are homotopic because they have been constructed as components of the null-homotopic cycle skeletonCycle with one of them reversed. This ensures that the condition 2 of the Homotopy Detection (THM entries are covered by real homotopies derived from the LHM) is fulfilled.

Condition 3: Minimality of the Skeleton Among Sets Meeting Conditions 1 and 2

Termination of the "while" loop, in Algorithm 8, implies that for every cycle that has ever been in the queue the "if" branch at lines 11 to 14 has been executed once (whenever the algorithm enters the "else" branch instead, the cycle is re-added to the queue afterwards).

Indirect proof: Assume the Skeleton is not minimal among sets meeting conditions 1 and 2. This implies that there is still one edge (called e) in the Skeleton that can be removed while adding a reference to another (according to the LHM using transitivity) homotopic path (called p) without introducing cyclic references. The fact that this homotopy has been derived from the LHM means there is a sequence $p(1), \ldots, p(n)$ of paths where $p(1)=[e]$ and $p(n)=p$ and for every pair $p(i)$, $p(i+1)$ there must be an entry $[Ie(i) \rightarrow Ip(i)]$ that directly supports the homotopy between $p(i)$ and $p(i+1)$. As $p(n)=p$ is not homotopic to $p(1)=[e]$ according to the assumption, there must be a minimum m with $p(m)$ not being homotopic to $p(m+1)$ according to the THM. But the cycle derived from the LHM entry $[Ie(m) \rightarrow Ip(m)]$ must have been processed by the algorithm and must therefore be null-homotopic according to the THM. Therefore $Ie(m)$ must be homotopic to $Ip(m)$ and therefore $p(m)$ must be homotopic to $p(m+1)$—a contradiction.

"Null-Homotopic Cycle Removal" vs. "Iterative Edge Removal":

Both the Iterative Edge Removal algorithm (algorithm 7) and the Null-Homotopic Cycle Removal algorithm (algorithm 8) start with a full Skeleton and iteratively remove edges from it by adding alternative paths to the THM.

They differ, however, in the way they find those homotopic alternatives. While the main loop in Iterative Edge Removal runs through a list of all edges and tries to replace them with alternatives found via hints from its neighbours, the Null-Homotopic Cycle Removal iterates over all the local homotopies that have to be incorporated into the THM and doesn't terminate until all those local homotopies are covered. This guarantees a minimal Skeleton and therefore that all the conditions set by the definition of the Homotopy Detection are met. This guarantee comes at the price of a higher worst-case asymptotical computational complexity, which though doesn't seem to be relevant in practice—there hasn't been a single practical case that would have required the algorithm to even once enter the "else" branch, whose existence is the reason for the worse theoretical complexity.

A person skilled in the art could introduce changes and modifications in the embodiments described without departing from the scope of the invention as it is defined in the attached claims.

The invention claimed is:

1. A computer implemented method for identifying channels from representative data in a 3D volume, the method comprising identifying, in a 3D volume of an object, three different zones based on values of at least one physical and/or functional parameter representative of physical and/or functional properties of said object, as a zone of a first type (H), a zone of a second type (BZ) and a zone of a third type (C), where said first, second and third zone types are different from each other, said object including zones which are susceptible to include constrained channels to be identified including myocardium conductive channels, wherein the method comprises performing the next steps by processing by a computer said representative data:
   automatically identifying as a candidate channel (bz) a path running through said zone of a second type (BZ) and extending between two points of said zone of a first type (H); and
   automatically performing, on a topological space (H_and_BZ_topo) including the zone of a first type (H) and the zone of a second type (BZ) and not including the zone of the third type (C), homotopic operations between said candidate channel (bz) and paths (h) running only through said zone of a first type (H), and if the result of said homotopic operations is that the candidate channel (bz) is not homotopic to any path running only through the zone of a first type (H) identifying the candidate channel (bz) as a constrained channel.

2. The method according to claim 1, wherein said physical and/or functional properties relate to propagation velocity properties, said zone of a first type (H) being a fast propagation velocity zone and said zone of a second type (BZ) being a slow propagation velocity zone.

3. The method according to claim 1, wherein said homotopic operations are performed for several candidate channels, and the method further comprising:
   performing a conversion of the 3D volume into said topological space, wherein said topological space is a combined zones topological space (H_and_BZ_topo), the method further comprising performing a conversion of said zone of a first type (H) into a corresponding single zone topological space (H_topo);
   processing said topological spaces (H_and_BZ_topo, H_topo) and obtaining equivalence classes for said paths, by means of implementing a first algorithm for obtaining said equivalence classes, which has as inputs both of said topological spaces (H_and_BZ_topo, H_topo) and which generates as output an output set of representatives of channel equivalence classes, one representative path per class, in a topological space; and
   performing said homotopic operation only for one representative path per equivalence class, both for channel candidates (bz) and for paths (h) running only through the zone of a first type (H).

4. The method according to claim 3, wherein said first algorithm comprises the following steps:
   choosing two points, Start and End, in the single zone topological space (H_topo);
   obtaining equivalence classes in the combined zones topological space (H_and_BZ_topo), for paths between said two points, said equivalent classes being termed 'ChannelCandidates';
   obtaining equivalence classes in the single zone topological space (H_topo), for paths between said two points, said equivalent classes being termed 'HealthyPaths';
   checking for every path bz in ChannelCandidates; and for every path h in HealthyPaths, if bz is homotopic to h discarding bz as constrained channel and advance to next bz, otherwise, i.e. if bz is not homotopic to any h, determining that bz is a constrained channel and adding it to said output set.

5. The method according to claim 4, further comprising collapsing/contracting said single zone topological space (H_topo) such that there is only one healthy path h having as said Start and End points one and the same point, wherein said step of checking if bz is homotopic to h and so discarding bz as constrained channel and advance to next bz or otherwise determining that bz is a constrained channel and adding it to said output set is performed for said only one healthy path h.

6. The method according to claim 5, wherein when it is known in advance the channel equivalence class homotopic to said only one healthy path h, said ChannelCandidates include all except said homotopic channel equivalence class, and said step of checking, for every path h in HealthyPaths, if bz is homotopic to h and so discarding bz as constrained channel and advance to next bz is omitted, all of the paths bz in Channel Candidates being added to the output set.

7. The method according to claim 6, further comprising implementing a channel optimization algorithm for optimizing said representatives of channel equivalence classes of said output set, said channel optimization algorithm comprising:
for one representative 'c' of every channel equivalence class, i.e. for every bz of the output set, and for several subpaths 'subpath' of 'c' finding the shortest path between the start and end of subpath: 'shortest'; and
if said shortest path, 'shortest', is homotopic to said subpath, 'subpath' modifying 'c' by replacing 'subpath' with 'shortest'.

8. The method according to claim 4, further comprising implementing a channel optimization algorithm for optimizing said representatives of channel equivalence classes of said output set, said channel optimization algorithm comprising:
for one representative 'c' of every channel equivalence class, i.e. for every bz of the output set, and for several subpaths 'subpath' of 'c' finding the shortest path between the start and end of subpath: 'shortest'; and
if said shortest path, 'shortest', is homotopic to said subpath, 'subpath' modifying 'c' by replacing 'subpath' with 'shortest'.

9. The method according to claim 4, further comprising implementing a second algorithm integrating said first algorithm, said second algorithm having as input data a geometrical space, regarding said 3D volume, with assigned functionality information allowing to perform said identifying of said three different zones (H, BZ, C), performing said conversions into said topological spaces (H_and_BZ_topo, H_topo) in the form of at least one data structure suitable for topological processing and added additional auxiliary information, and which generates as output said set of representatives of channel equivalence classes, in a geometrical space.

10. The method according to claim 9, wherein said at least one data structure is a connectivity graph with a Local Homotopy Map (LHM) which contains for every edge of the graph a set of paths that are homotopic to it.

11. The method according to claim 10, further comprising implementing a third algorithm for converting the 3D volume into said graph and LHM, said third algorithm having as input the geometrical space represented by nodes ns and elements els connecting said nodes ns, as long as the elements els are the convex hull of their nodes ns, and generating as output the topological space represented by said graph and said LHM, wherein said third algorithm comprises:
for every element el in els, and
for every node n1 in nodes(el), and
for every node n2 in nodes(el) \ {n1}:
adding nodes n1 and n2 to graph; and
adding edge (n1, n2) to graph; and
for every node n3 in nodes(el) \ {n1, n2}:
adding homotopy between (n1, n2) and [n1, n3, n2] to LHM.

12. The method according to claim 11, further comprising implementing a homotopy detection algorithm having as input said graph and said LHM, and transforming said input into an output including the following two data structures, which constitute said additional auxiliary information:
Skeleton: a subset of edges, from the edges of said graph, meeting the conditions below; and
Transitive Homotopy Map (THM): a table that maps every edge that is not part of the Skeleton to one homotopic path in a way that is compatible with the conditions below;
wherein said conditions are:
a first condition comprising no cyclic references in THM: the transitive hull of a relation dependsOn defined by dependsOn(a, b)⇔b∈THM[a] is not allowed to have any reflexive entries;
a second condition comprising that references in THM have to be covered by real homotopies, represented by the LHM: the THM is allowed to map an edge e to a path p, only if it can be deduced by the LHM and the mathematical properties of homotopy that e is homotopic to p; and
a third condition comprising that Skeleton has to be minimal, or as minimal as possible, among sets meeting said first and second conditions.

13. The method according to claim 12, further comprising implementing a Homotopy check algorithm having as inputs paths which are, in general, out of the Skeleton (p1, p2) and also the Skeleton and the THM, and comprising applying at first a Skeleton Projection algorithm and then a Reversal Point Removal algorithm to both paths p1 and p2 and further comparing a result obtained, where said Skeleton Projection algorithm consists of the iterative replacement of all edges e in the input path that are not in the Skeleton by THM[e], until all edges in the path are in the Skeleton, and where said Reversal Point Removal algorithm consists of the iterative replacement of all sub-sequences matching the pattern [n1, n2, n1] in a node list representation of the path by a simplified node sequence [n1], until no sub-sequences matching said pattern occur in the path.

14. The method according to claim 13, wherein one of said paths projected into the Skeleton and without reversal points (p1") is one of said channel candidates (bz) and the other (p2") is one path (h) running only through the zone of a first type (H).

15. The method according to claim 14, further comprising an Iterative Edge Removal algorithm for constructing said Skeleton and said THM using as inputs the graph and the LHM, said Iterative Edge Removal algorithm including the following steps:
initializing the Skeleton as a set of all edges in the input graph;
starting with an empty THM; and
iteratively applying an Edge Removal Step until no more changes can be made to the Skeleton by:

choosing an edge e from the Skeleton, choosing a homotopic path p from the LHM entry corresponding to e, applying the Skeleton Projection and Reversal Point Removal algorithms to said homotopic path p, and if the resulting projected path does not contain the edge e, then removing e from the Skeleton and adding a mapping from the edge e to the projected path to the THM.

16. The method according to claim 12, further comprising an Iterative Edge Removal algorithm for constructing said Skeleton and said THM using as inputs the graph and the LHM, said Iterative Edge Removal algorithm including the following steps:

initializing the Skeleton as a set of all edges in the input graph;

starting with an empty THM; and iteratively applying an Edge Removal Step until no more changes can be made to the Skeleton by:

choosing an edge e from the Skeleton, choosing a homotopic path p from the LHM entry corresponding to e, applying the Skeleton Projection and Reversal Point Removal algorithms to said homotopic path p, and if the resulting projected path does not contain the edge e, then removing e from the Skeleton and adding a mapping from the edge e to the projected path to the THM.

17. The method according to claim 1, further comprising implementing a second algorithm integrating said first algorithm, said second algorithm having as input data a geometrical space, regarding said 3D volume, with assigned functionality information allowing to perform said identifying of said three different zones (H, BZ, C), performing said conversions into said topological spaces (H_and_BZ_topo, H_topo) in the form of at least one data structure suitable for topological processing and added additional auxiliary information, and which generates as output said set of representatives of channel equivalence classes, in a geometrical space.

* * * * *